(12) United States Patent
Nguyen et al.

(10) Patent No.: US 11,451,360 B2
(45) Date of Patent: Sep. 20, 2022

(54) PRIORITY-BASED FEEDBACK TRIGGERING

(71) Applicant: QUALCOMM Incorporated, San Diego, CA (US)

(72) Inventors: Tien Viet Nguyen, Bridgewater, NJ (US); Sudhir Kumar Baghel, Hillsborough, NJ (US); Kapil Gulati, Hillsborough, NJ (US); Arjun Bharadwaj, Cupertino, CA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 16/737,738

(22) Filed: Jan. 8, 2020

(65) Prior Publication Data

US 2020/0228292 A1 Jul. 16, 2020

Related U.S. Application Data

(60) Provisional application No. 62/790,870, filed on Jan. 10, 2019.

(51) Int. Cl.
*H04L 5/00* (2006.01)
*H04W 24/08* (2009.01)
*H04L 5/16* (2006.01)

(52) U.S. Cl.
CPC ........... *H04L 5/0055* (2013.01); *H04W 24/08* (2013.01); *H04L 5/16* (2013.01)

(58) Field of Classification Search
CPC ......... H04L 5/0055; H04L 5/16; H04W 24/08
See application file for complete search history.

(56) References Cited

U.S. PATENT DOCUMENTS

| 10,834,763 | B2 * | 11/2020 | Yi | ..................... H04W 72/1257 |
| 2016/0330011 | A1 | 11/2016 | Lee et al. | |
| 2019/0132104 | A1 | 5/2019 | Lee et al. | |

(Continued)

FOREIGN PATENT DOCUMENTS

| WO | WO-2017192009 A1 | 11/2017 | |
| WO | WO-2018169327 A1 * | 9/2018 | ........... H04L 1/1887 |
| WO | WO-2020011336 A1 * | 1/2020 | ........ H04W 72/1278 |

OTHER PUBLICATIONS

International Search Report and Written Opinion—PCT/US2020/012935—ISA/EPO—dated Jul. 1, 2020.

(Continued)

*Primary Examiner* — Michael J Moore, Jr.
(74) *Attorney, Agent, or Firm* — Holland & Hart LLP/Qualcomm

(57) ABSTRACT

Methods, systems, and devices for wireless communication are described. A user equipment (UE) may utilize priority levels associated with packets or transmissions to determine whether to transmit feedback for a received transmission. The UE may compare priority levels between a transmission subject to a feedback condition and a transmission scheduled to be received when the feedback is scheduled to be transmitted to determine whether to send the feedback. The UE may communicate with the transmitting device according to the comparison and the determining. The UE may determine signal conditions causing a NAK and determine to send the NAK based on the signal conditions.

30 Claims, 16 Drawing Sheets

(56) References Cited

U.S. PATENT DOCUMENTS

| | | | |
|---|---|---|---|
| 2020/0127793 A1* | 4/2020 | Kim | H04L 1/1854 |
| 2020/0145179 A1* | 5/2020 | Garcia-Luna-Aceves | H04L 5/0055 |
| 2020/0169377 A1* | 5/2020 | Lee | H04W 72/0446 |
| 2020/0195414 A1* | 6/2020 | Nguyen | H04L 5/1469 |
| 2020/0228292 A1* | 7/2020 | Nguyen | H04L 5/0055 |
| 2021/0050958 A1* | 2/2021 | Sarkis | H04L 1/1854 |
| 2021/0127364 A1* | 4/2021 | Panteleev | H04W 72/0446 |
| 2021/0144682 A1* | 5/2021 | Baghel | H04L 1/1887 |
| 2021/0219320 A1* | 7/2021 | Belleschi | H04W 72/1278 |

OTHER PUBLICATIONS

Partial International Search Report—PCT/US2020/012935—ISA/EPO—dated Apr. 28, 2020.

* cited by examiner

PRIORITY-BASED FEEDBACK TRIGGERING

CROSS REFERENCE

The present Application for Patent claims the benefit of U.S. Provisional Patent Application No. 62/790,870 by NGUYEN et al., entitled "NEGATIVE ACKNOWLEDGEMENT TRIGGERING IN MULTICAST OR BROADCAST TRANSMISSIONS," filed Jan. 10, 2019, assigned to the assignee hereof, and expressly incorporated by reference herein.

BACKGROUND

The following relates generally to wireless communication, and more specifically to priority-based feedback triggering.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a UE may receive a packet from a transmitting device, such as a base station or another UE, and the UE may not be able to decode the received packet. In response, the UE may transmit a negative acknowledgement (NAK) message to the transmitting device, which may trigger a retransmission of the packet. However, in some instances, the NAK message may be scheduled for transmission by the UE at a same time that a different packet is being transmitted to the UE. If the UE is operating in half duplex, the UE may not be enabled to both transmit the NAK message and receive the different packet at the same time. As a result, if the UE proceeds to transmit the NAK message, reception of the other packet may be punctured, resulting in data loss. This conflict could occur in unicast scenarios as well as in multicast or broadcast systems.

SUMMARY

The described techniques relate to improved methods, systems, devices, and apparatuses that support negative acknowledgement (NAK) triggering in multicast or broadcast transmissions. More particularly, a user equipment (UE) may utilize priority levels associated with packets or transmissions to determine whether to transmit a NAK or other feedback responsive to a reception failure corresponding to a packet or transmission. The UE may compare priority levels between a packet or transmission subject to a feedback condition and a packet scheduled to be received when the feedback is scheduled to be transmitted to determine whether to send the feedback. The UE may communicate with the transmitting device in accordance with the comparison and the determining.

A method of wireless communication at a UE is described. The method may include identifying a first priority level of a first transmission by a transmitting device, where the first transmission is subject to a feedback condition, identifying a second priority level associated with a second transmission scheduled to be received at a time that the UE is scheduled to transmit feedback for the first transmission in accordance with the feedback condition, comparing the first priority level with the second priority level, determining whether to transmit the feedback for the first transmission based on the comparing and on the UE operating in half duplex, and communicating with the transmitting device in accordance with the determining.

An apparatus for wireless communication at a UE is described. The apparatus may include a processor, memory coupled with the processor, and instructions stored in the memory. The instructions may be executable by the processor to cause the apparatus to identify a first priority level of a first transmission by a transmitting device, where the first transmission is subject to a feedback condition, identify a second priority level associated with a second transmission scheduled to be received at a time that the UE is scheduled to transmit feedback for the first transmission in accordance with the feedback condition, compare the first priority level with the second priority level, determine whether to transmit the feedback for the first transmission based on the comparing and on the UE operating in half duplex, and communicate with the transmitting device in accordance with the determining.

Another apparatus for wireless communication at a UE is described. The apparatus may include means for identifying a first priority level of a first transmission by a transmitting device, where the first transmission is subject to a feedback condition, identifying a second priority level associated with a second transmission scheduled to be received at a time that the UE is scheduled to transmit feedback for the first transmission in accordance with the feedback condition, comparing the first priority level with the second priority level, determining whether to transmit the feedback for the first transmission based on the comparing and on the UE operating in half duplex, and communicating with the transmitting device in accordance with the determining.

A non-transitory computer-readable medium storing code for wireless communication at a UE is described. The code may include instructions executable by a processor to identify a first priority level of a first transmission by a transmitting device, where the first transmission is subject to a feedback condition, identify a second priority level associated with a second transmission scheduled to be received at a time that the UE is scheduled to transmit feedback for the first transmission in accordance with the feedback condition, compare the first priority level with the second priority level, determine whether to transmit the feedback for the first transmission based on the comparing and on the UE operating in half duplex, and communicate with the transmitting device in accordance with the determining.

In some examples of the method, apparatuses, and non-transitory computer-readable medium described herein, identifying the second priority level may include operations, features, means, or instructions for identifying the second priority level based on a priority level associated with a transmission by the UE, where the second transmission may be feedback corresponding to the transmission by the UE.

In some examples of the method, apparatuses, and non-transitory computer-readable medium described herein, determining whether to transmit the feedback for the first transmission may include operations, features, means, or instructions for determining that the first priority level may be greater than the second priority level based on the comparing, and determining to transmit the feedback for the first transmission to the transmitting device based at least part on the first priority level being greater than the second priority level.

In some examples of the method, apparatuses, and non-transitory computer-readable medium described herein, determining whether to transmit the feedback for the first transmission may include operations, features, means, or instructions for determining that the first priority level may be less than the second priority level based on the comparing, and determining to avoid transmission of the feedback for the first transmission based on the first priority level being less than the second priority level.

In some examples of the method, apparatuses, and non-transitory computer-readable medium described herein, determining whether to transmit the feedback for the first transmission may include operations, features, means, or instructions for determining that the first priority level may be less than the second priority level based on the comparing, estimating a decoding performance associated with receipt of the second transmission that would result from transmission of the feedback for the first transmission during the time that the second transmission may be scheduled to be received, and determining to transmit the feedback for the first transmission during the time based on the decoding performance.

In some examples of the method, apparatuses, and non-transitory computer-readable medium described herein, the estimating may be dependent on a capability of the UE.

In some examples of the method, apparatuses, and non-transitory computer-readable medium described herein, determining whether to transmit the feedback for the first transmission may include operations, features, means, or instructions for determining that the first priority level corresponds to the second priority level based on the comparing.

Some examples of the method, apparatuses, and non-transitory computer-readable medium described herein may further include operations, features, means, or instructions for determining to transmit the feedback to the transmitting device based on a feedback transmission probability.

In some examples of the method, apparatuses, and non-transitory computer-readable medium described herein, the feedback transmission probability may be based on a distance between the UE and the transmitting device, a determined congestion level, or a combination thereof.

Some examples of the method, apparatuses, and non-transitory computer-readable medium described herein may further include operations, features, means, or instructions for receiving, from the transmitting device, sidelink control signaling indicating the feedback transmission probability.

Some examples of the method, apparatuses, and non-transitory computer-readable medium described herein may further include operations, features, means, or instructions for identifying that the first transmission may be subject to a negative acknowledgement (NAK) in accordance with the feedback condition, and identifying a signal condition from which the NAK arises, where the signal condition indicates at least whether the NAK may be caused by signal interference.

Some examples of the method, apparatuses, and non-transitory computer-readable medium described herein may further include operations, features, means, or instructions for identifying that the NAK may be caused by the signal interference, and determining, responsive to the signal interference causing the NAK, to transmit the NAK to the transmitting device based on a NAK transmission probability.

In some examples of the method, apparatuses, and non-transitory computer-readable medium described herein, the NAK transmission probability may be based on a distance between the UE and the transmitting device, a determined congestion level, or a combination thereof.

Some examples of the method, apparatuses, and non-transitory computer-readable medium described herein may further include operations, features, means, or instructions for identifying a source other than signal interference from which the NAK arises, and determining to transmit the NAK based on the identifying the source other than signal interference.

In some examples of the method, apparatuses, and non-transitory computer-readable medium described herein, determining to transmit the NAK may include operations, features, means, or instructions for comparing a congestion level to a threshold, where the determining to transmit the NAK may be based on the comparing.

Some examples of the method, apparatuses, and non-transitory computer-readable medium described herein may further include operations, features, means, or instructions for receiving the congestion level threshold from the transmitting device.

Some examples of the method, apparatuses, and non-transitory computer-readable medium described herein may further include operations, features, means, or instructions for determining the congestion level threshold at the UE.

Some examples of the method, apparatuses, and non-transitory computer-readable medium described herein may further include operations, features, means, or instructions for comparing a distance between the UE and the transmitting device to the threshold, where the determining to transmit the NAK may be based on the comparing and where the threshold may be a distance threshold.

Some examples of the method, apparatuses, and non-transitory computer-readable medium described herein may further include operations, features, means, or instructions for determining a measurement for one or both of reference signal received power (RSRP) and reference signal received quality (RSRQ), and identifying whether the measurement may be higher than a threshold to identify the signal condition.

Some examples of the method, apparatuses, and non-transitory computer-readable medium described herein may further include operations, features, means, or instructions for receiving a first control signal from a first transmitting device and a second control signal from a second transmitting device, where the first transmitting device and the second transmitting device may be determined to satisfy a proximity condition based on the first control signal and the second control signal, decoding the first control signal and the second control signal to identify that the first control signal and the second control signal may be subject to interference, and identifying that the NAK may be caused by the signal interference based on the decoding.

A method of wireless communication at a transmitting device is described. The method may include transmitting, to at least one UE via control signaling, a feedback condition transmission indicator, communicating a transmission to at least the UE, and receiving, from the UE, a feedback associated with the communicated transmission, in accordance with the feedback condition transmission indicator.

An apparatus for wireless communication at a transmitting device is described. The apparatus may include a processor, memory coupled with the processor, and instructions stored in the memory. The instructions may be executable by the processor to cause the apparatus to transmit, to at least one UE via control signaling, a feedback condition transmission indicator, communicating a transmission to at least the UE, and receive, from the UE, a feedback associated with the communicated transmission, in accordance with the feedback condition transmission indicator.

Another apparatus for wireless communication at a transmitting device is described. The apparatus may include means for transmitting, to at least one UE via control signaling, a feedback condition transmission indicator, communicating a transmission to at least the UE, and receiving, from the UE, a feedback associated with the communicated transmission, in accordance with the feedback condition transmission indicator.

A non-transitory computer-readable medium storing code for wireless communication at a transmitting device is described. The code may include instructions executable by a processor to transmit, to at least one UE via control signaling, a feedback condition transmission indicator, communicating to at least the UE, and receive, from the UE, a feedback associated with the communicated transmission, in accordance with the feedback condition transmission indicator.

In some examples of the method, apparatuses, and non-transitory computer-readable medium described herein, the feedback condition transmission indicator indicates a feedback transmission probability for the UE to determine whether to send the feedback.

In some examples of the method, apparatuses, and non-transitory computer-readable medium described herein, the feedback transmission probability may be dependent on a distance between the transmitting device and the UE.

In some examples of the method, apparatuses, and non-transitory computer-readable medium described herein, the feedback transmission probability may be dependent on a congestion level.

In some examples of the method, apparatuses, and non-transitory computer-readable medium described herein, the feedback condition transmission indicator indicates a congestion level threshold for the UE to determine whether to send the feedback.

DETAILED DESCRIPTION

Figure 1:
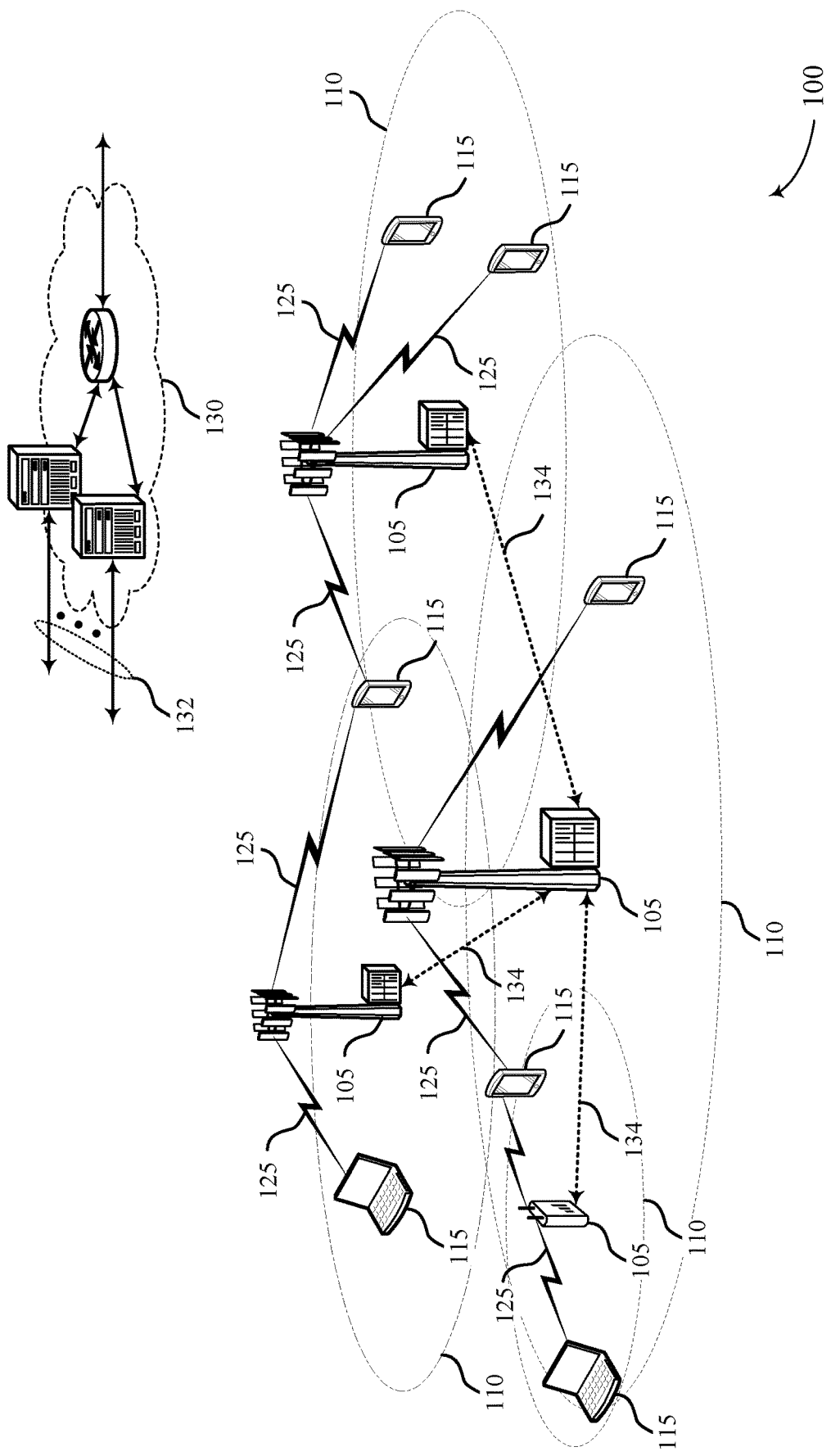
FIG. 1 illustrates an example of a system for wireless communication that supports priority-based feedback triggering in accordance with aspects of the present disclosure.

In some cases, a user equipment (UE) receives a packet or transmission from a transmitting device, such as a base station or another UE, and is not able to decode or recognize the received packet or transmission. In response, the UE may transmit feedback, such as a negative acknowledgement (NAK) message to the transmitting device, which may trigger a retransmission of the packet. However, in some instances, the NAK message may be scheduled for transmission by the UE at a same time that a different packet or transmission is being transmitted to the UE. If the UE is operating in half duplex, the UE may not be enabled to both transmit the feedback message and receive the different packet or transmission at the same time. As a result, if the UE proceeds to transmit the feedback message, reception of the other transmission may be punctured, resulting in data loss. Additionally, in a broadcast or multicast environment, the transmission of NAKs by one or more UEs may cause congestion. In a broadcast or multicast environment, each UE that fails to decode a broadcast or multicast message may transmit a NAK.

In a broadcast or multicast environment, a NAK sent by a UE for a broadcast or multicast message may result in the message being retransmitted to all potential receivers of the message (e.g., re-broadcast or re-multicast). In some circumstances, depending on the nature of interference that results in a UE not being able to decode a broadcast or multicast message, many UEs may simultaneously not be able to decode the message (e.g., be affected by the same instance of interference). Thus, there may be times in a broadcast or multicast environment when a UE may elect to not send a NAK based on a determination that other UEs are likely to send the NAK anyway, thus triggering a retransmission for all UEs that were originally intended to receive the message.

The decision regarding whether to transmit a NAK may be linked to priority levels of incoming messages. A UE may leverage priority levels associated with packets to determine whether to transmit a NAK responsive to a received packet. For example, if a priority level associated with a first packet subject to a transmission decode failure is greater than a priority level associated with a second packet that is scheduled for receipt during the time that the NAK is scheduled to be sent, then the UE may determine to transmit the NAK during the time. Similarly, if the second priority level is determined to be greater than the first, then the UE may determine to avoid transmission of the NAK.

Similarly, the decision regarding whether to transmit feedback (e.g., acknowledgement (ACK) or NAK) may be linked to priority levels of the associated messages. A UE may leverage priority levels associated with transmissions to determine whether to transmit feedback responsive to a received transmission. For example, if a priority level associated with a first received transmission subject to a feedback condition is greater than a priority level associated with a second transmission that is scheduled for receipt during the time that the feedback for the first transmission is scheduled to be sent, then the UE may determine to transmit the feedback during that time. Similarly, if the second priority level is determined to be greater than the first, then the UE may determine to avoid transmission of the feedback for the first transmission. In some cases, the second transmission corresponds to feedback for another transmission that was sent by the UE. Thus, the priority level for the second transmission may correspond to the priority level of the transmission sent by the UE for which the feedback (second transmission) is scheduled to be received.

However, if the priority levels are equal, then the UE may benefit from determining the likelihood that other UEs in the broadcast or multicast environment will be transmitting a NAK or other feedback. If the priority levels are equal, then the UE may determine to transmit the feedback using a probabilistic framework. In some cases, the probability is based on a distance between the UE and the transmitting device (e.g., a UE or base station), where the probability of transmitting the feedback decreases with an increase in distance between the UE and the transmitting device. With many UEs around a transmitting device subject to the probabilistic framework, the probability that at least one UE transmits a feedback may approach 100%, but the framework may prevent all of the UEs from transmitting feedback. Accordingly, congestion may be reduced based on the reduction of feedback transmissions by many UEs in an environment.

If a feedback for a first transmission is a NAK, and the first transmission failed to be decoded due to a source other than signal interference (e.g., blocking, fast/deep fading, or shadowing), then the UE may determine to transmit the NAK based on a threshold. The threshold may correspond to a congestion level and/or a distance between the UE and the transmitting device. For example, the UE may determine a congestion level in the system, compare the determined congestion level to a threshold, and determine to transmit the NAK based on the congestion level relative to the threshold. In another example, the UE may determine a congestion level in the system, determine a distance threshold based on the congestion level, and determine to transmit the NAK based on a distance between the UE and the transmitter relative to the threshold. In some cases, a transmitting device may transmit an indication of the threshold (e.g., congestion level and/or distance), the probabilistic framework, or other control metrics via control signaling. In some cases, the UE may dynamically or autonomously determine congestion level or distance thresholds used to determine NAK responses.

Aspects of the disclosure are initially described in the context of a wireless communications system. Aspects of the disclosure are further described in the context of a broadcast or multicast system, a time/frequency graph, and process flow diagrams. Aspects of the disclosure are further illustrated by and described with reference to apparatus diagrams, system diagrams, and flowcharts that relate to priority-based feedback triggering.

FIG. 1 illustrates an example of a wireless communications system 100 that supports priority-based feedback triggering in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

UEs 115 in the wireless communications system 100 may receive packets from base stations 105 or other UEs 115 in a multicast or broadcast scenario. In some cases, a receiving UE is not able to recognize or decode the packet based on signal conditions in the system 100. In such cases, the packet may be subject to a transmission decode failure, where the UE may determine to transmit a NAK in response to the failed reception of the packet. The transmitted NAK may cause the transmitting device (e.g., the base station 105 or other UE 115) to retransmit the packet. In some cases, the UE 115 may be scheduled to transmit the NAK during a time when another packet is scheduled to be received. If the UE 115 is operating in half duplex (e.g., can transmit or receive but not both contemporaneously), transmission of the NAK during receipt of the subsequent packet may cause puncturing (e.g., loss of data) in the subsequent packet. The implementations described herein provide a framework for the UE 115 to determine whether to send the NAK based on priority levels between packets, signal conditions triggering the NAK, NAK transmission probabilities, and/or distance or congestion level thresholds. In some cases, these implementations allow for the UE 115 leverage multicast or broadcast environments to reduce or avoid increasing congestion levels by not sending NAKs in certain scenarios.

These frameworks may also be used in other scenarios. For example, a UE may receive a first transmission from a transmitting device, and the first transmission may have a first priority level and may be subject to a feedback condition. The feedback condition may indicate that the UE is to transmit feedback (e.g., ACK or NAK) for the first transmission. The UE may also be scheduled to receive a second transmission at the time the UE is scheduled to transmit the feedback for the first transmission, and the second transmission may be associated with a second priority level. The UE may determine whether to transmit the feedback for the first transmission based on a comparison between the first priority level and the second priority level. In some cases, the second transmission is a feedback transmission corresponding to another transmission sent by the UE. In such cases, the second priority level corresponds to the priority level of the transmission sent by the UE.

Figure 2:
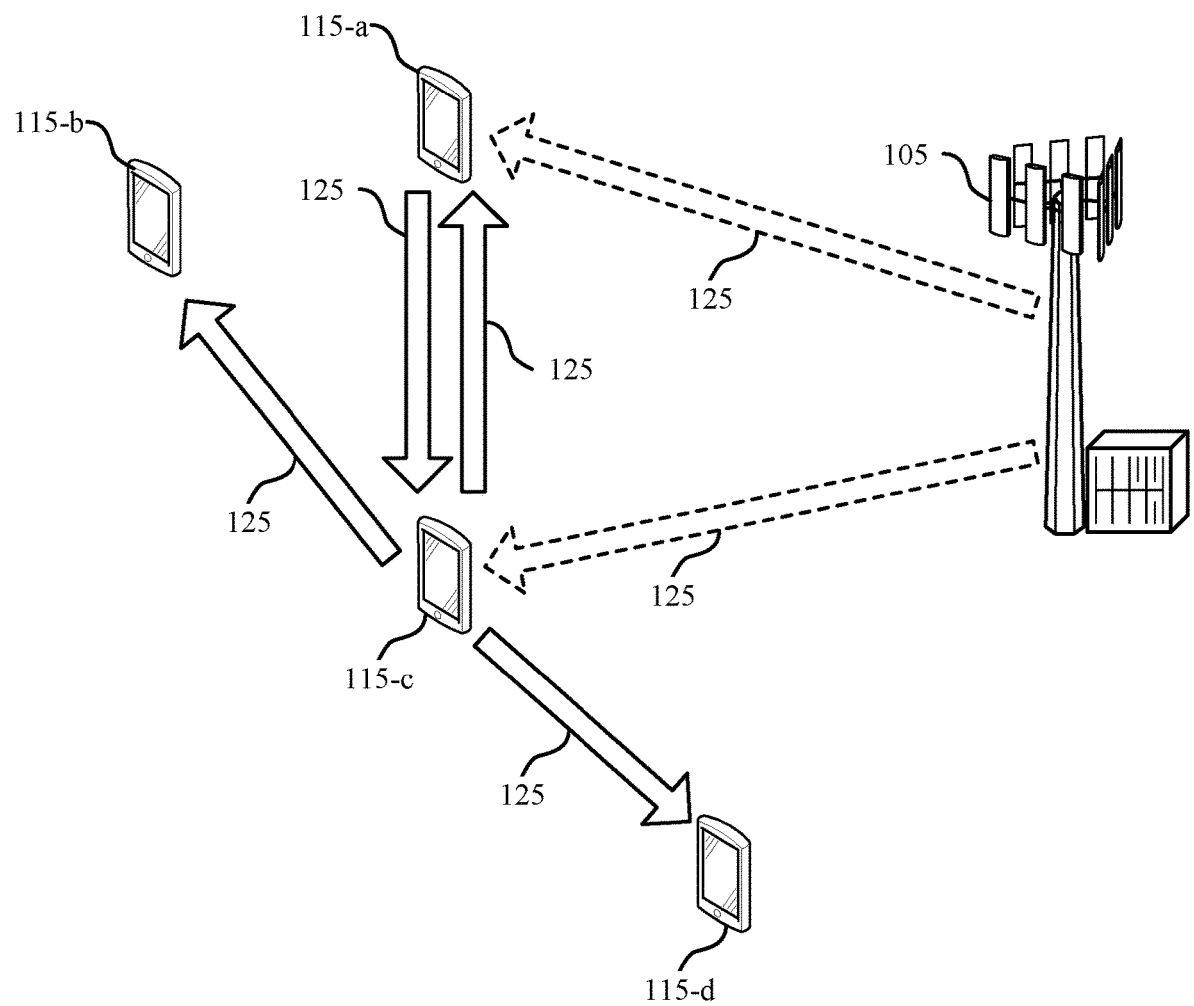
FIG. 2 illustrates an example of a system that supports priority-based feedback triggering in accordance with aspects of the present disclosure.

FIG. 2 illustrates an example of a system 200 that supports priority-based feedback triggering in accordance with aspects of the present disclosure. In some examples, system 200 may implement aspects of wireless communication system 100. The system 200 illustrates a multicast or broadcast scenario in which a UE 115-c transmits one or more packets to UEs 115-a, 115-b, and 115-d via communication links 125 (e.g., via P2P or D2D protocol). In a broadcast scenario the UE 115-c transmits the packets to any UEs 115 that are within a reception range of UE 115-c, and in a multicast scenario, the UE 115-c transmits the packets to a set of two or more specific UEs 115 within a reception range of the UE 115-c. In some cases, the base station 105 may broadcast or multicast packets to UEs 115. The implementation are described with respect to UE 115-c broadcasting or multicasting packets by a UE 115, but it should be understood that the implementations are applicable to other transmitting devices (e.g., UEs 115 and base stations 105). In some examples, UEs 115 may be vehicles participating in vehicle-to-everything (V2X) broadcast or multicast transmissions. FIG. 2 includes the base station 105, but it should be understood that the implementations described herein are applicable to scenarios that may not include a base station 105. As described, the implementations are applicable to D2D, P2P, and/or V2X environments, which may not include communications with base stations in some scenarios.

In the example of system 200, the UEs 115-*a*, 115-*b*, and 115-*d* receive a packet from the UE 115-*c* via the communication links 125. In some cases, the packets may be multicast or broadcast via the same frequency resource (e.g., single frequency network). In some cases and for various reasons, the one or more of the UEs 115-*a*, 115-*b*, and 115-*d* may not recognize or may not be able to decode the received packet. In such cases, the UEs 115 that are not able to recognize or decode the packet may respond to the UE 115-*c* (e.g., the transmitting device) with a NAK. The NAK may be scheduled for transmission in one or more time periods specified in configurations or via control signaling. In response to receiving the NAK, the UE 115-*c* may rebroadcast or multicast the packet. Accordingly, if multiple UEs 115 receive a packet over a frequency resource and the packet is subject to a transmission decode failure (e.g., because the UEs 115 are unable to decode or recognize the packet), then multiple UEs 115 may respond via the same frequency resource with a NAK transmission. The transmitting device (e.g., the UE 115-*c*) may respond to the NAK over the frequency resource with the same packet broadcast or multicast. As a result of a packet being transmitted, NAKs transmitted, and the packet retransmitted, the system 200 may incur increased congestion.

Further, one or more of the UEs 115 receiving the packet subject to the transmission decode failure may be scheduled to receive an additional packet via a different frequency resource during the time that the NAK is scheduled to be transmitted. For example, the UE 115-*a* receives the packet from the UE 115-*c* and is scheduled to send a NAK over a first 5 MHz of a 10 MHz channel and is also scheduled to receive a packet over the second 5 MHz of the 10 MHz channel during the same subframes or overlapping subframes. If the UE 115-*a* is operating in half duplex, then transmitting the NAK during receipt of the second packet may result in data loss (e.g., puncturing) corresponding to the second packet.

In some scenarios, the UEs 115 may receive a first transmission from another UE, and the first transmission may be subject to a feedback condition. That is, the UEs 115 that receive the first transmission may be scheduled to transmit an ACK or NAK for the first transmission. However, the UE 115 may be scheduled to transmit the ACK or NAK for the first transmission when a second transmission is scheduled to be received (e.g., from another UE 115). In some cases, the second transmission is a feedback response for another transmission by the UE. As such, there may be a conflict between feedback transmissions at a UE (e.g., feedback scheduled for transmission and a feedback scheduled for receipt).

In order to avoid puncturing or data loss, the UE 115-*a* may leverage priority levels associated with the packets or transmissions to determine whether to transmit the feedback. To determine the priority levels associated with packets or transmissions, the UE 115-*a* may utilize a quality of service (QoS) indicator associated with the packets or transmissions. In a 5G implementation, the QoS indicator may be a 5G QoS Indicator (5QI), which defines a packet loss rate, packet delay budget, etc. The UE 115-*a* may utilize these values to determine a priority of the packet or transmissions.

If the packet subject to a transmission decode failure has a higher priority than the packet scheduled to be received, then the UE 115-*a* may determine to transmit the NAK. In contrast, if the packet subject to the transmission decode failure has a lower priority than the packet scheduled to be received, then the UE 115-*a* may determine to avoid transmitting the NAK. In some cases, if the packet subject to the transmission decode failure has a lower priority than the packet scheduled to be received, the UE 115-*a* may estimate a decoding performance for second packet that would result from transmission of the NAK during receipt of the second packet. If the UE 115-*a* determines that it may be able to sufficiently decode the second packet if the NAK is transmitted, then the UE 115-*a* may determine to transmit the NAK. If the UE 115-*a* determines that it may not be able to decode the packet if the NAK is transmitted, then the UE 115-*a* may determine to not transmit the NAK. The UEs 115 may utilize techniques described herein to determine the priority levels associated with packets, and these priority level scenarios may be applicable in unicast, multicast, or broadcast environments.

Similarly, if a transmission subject to a feedback condition (e.g., a first transmission) has a higher priority than a priority associated with a second transmission that is scheduled to be received, then the UE 115-*a* may determine to transmit the feedback for the first transmission. In contrast, if the transmission subject to the feedback condition has a lower priority than a priority associated with the second transmission, then the UE 115-*a* may determine to avoid transmission the feedback for the first transmission. In cases where the second transmission is a feedback response for a transmission sent by the UE 115-*a*, then the priority level associated with the second transmission may correspond to the priority level of the transmission sent by the UE.

If the UE 115-*a* determines that the priority levels associated with the packets correspond (e.g., equal, equivalent, or within an identified range), then the UE 115-*a* may determine the signal condition giving arise to the transmission decode failure associated with the packet. The signal condition may inform the UE 115-*a* as to whether the transmission decode failure is caused by signal interference or a source other than signal interference. In some cases, the UE 115-*a* determines the signal conditions causing the transmission decode failure (e.g., reception failure) by control decoding or by reference signal received power (RSRP) or reference signal received quality (RSRQ) measurements. In a control decoding process, the UE 115-*a* receives two signals from two different transmitting devices that are determined to satisfy a proximity condition. The locations of the devices may be determined based on decoded control information in the control signals. If the UE 115-*a* determines that the data resources in the signals interfere with each other (e.g., the data resources overlap), the UE 115-*a* may determine that the reception failure (e.g., the signal condition) is due to signal interference. If the control signals do not indicate any resource overlapping, then the UE 115-*a* may conclude that the reception failure was due to a source other than signal interference, such as shadowing, blocking, or fast/deep fading. In a RSRP or RSRQ measurement process, if the packet is subject to a transmission decode failure and the RSRP/RSRQ is higher than a certain threshold, then the UE 115-*a* may conclude that the decoding failure is due to interference. If the RSRP or RSRQ measurement is lower than the threshold, then the UE 115-*a* may conclude that the reception failure was due to a source other than signal interference, such as shadowing, blocking, or deep fading.

In a broadcast or multicast scenario, if the UE 115-*a* determines that the NAK is caused by signal interference, the UE 115-a may be configured to transmit the NAK based on a probability. This probability may be a function of the distance between the UE 115-a and the UE 115-c (e.g., the transmitting device) and/or a function of a determined congestion level in the system 100 or geographic coverage area 110. The probability of sending the NAK may decrease with an increase in the distance and/or the congestion level. Because the UE 115-a is one of many (e.g., two or more) UEs 115 that received the packet (e.g., the packet was multicast or broadcast) and because the UE 115-a determines that the signal condition is caused by signal interference and other UEs 115 are likely subject to the same signal interference, then the probabilistic framework effectually allows the UE 115-a assume that another UE 115 (e.g., UE 115-d) will send a NAK. Thus, with many UEs 115 subject to the signal interference, the likelihood that a NAK is transmitted by one of the UEs 115 approaches 100%. The probability function which the UEs 115 utilize to determine whether to transmit the NAK may be autonomously configured by the UE 115 (e.g., the UE 115 determines the function based on a congestion level) or may be configured by the transmitting device such as the UE 115-c or base station 105.

If the UE 115-a determines that the transmission decode failure is caused by a source other than signal interference, then the UE 115-a may determine to transmit the NAK based on a threshold. In some cases, the source other than signal interference is blocking, fast fading, or shadowing, which are the result of the environment particular to the UE 115-a rather than the environment of the multiple UEs 115, such as it is the case with signal interference. Therefore, the UE 115-a may not assume that another UE 115 is subject to the same conditions and will transmit the NAK. As a result, the UE 115-a may consider the threshold, which may be a distance or congestion level threshold. For example, if the UE 115-a is within a certain distance from the base station 105, then the UE 115-a sends the NAK. In some cases, the UE 115-a may receive the threshold to be considered from a transmitting device such as the UE 115-c or base station 105 via control signaling (e.g., sidelink control signaling). Additionally or alternatively, the transmitting device (e.g., the UE 115-c or base station 105) or the receiving device (e.g., the UE 115-a) may autonomously or dynamically determine the threshold.

To autonomously or dynamically determine thresholds for determining whether to transmit the NAK, a transmitting device may determine a congestion level of the system 200. If the system 200 is congested, the transmitting device may lower the distance threshold for triggering a NAK and transmit an indicator including the updated distance thresholds to receiving devices, which may increase likelihood of satisfaction of a range requirement on the UEs 115. In effect, this may decrease the likelihood that a receiving UE 115 sends a NAK, because the UE 115 is not within the distance threshold. This may effectively reduce or prevent an increase in congestion level in the system 200. The transmitting device (e.g., UE 115 or base station 105) may indicate the adjusted threshold via control signaling such as sidelink control signaling. In some cases, the receiving UE 115 may determine the congestion level and autonomously adjust the distance threshold for determining whether to transmit the NAK.

In some example implementations, the UEs 115 may use the probabilistic framework in scenarios other than signal conditions caused by interference or in cases where packets do not have corresponding priorities. In such implementations, the base station 105 or other transmitting device may configure the UEs 115 to use the probabilistic framework using control signaling. As such, the transmitting device may override the configuration of the UEs 115.

Further, in some cases, the UEs 115 may utilize the probabilistic framework in scenarios when the UE 115 does not consider the signal condition causing a NAK. For example, when the UE 115 is scheduled to transmit any feedback (e.g., ACK or NAK) when another transmission is scheduled to be received, then the UE 115 may consider the priority levels (as described above) and if the priority levels are equal, then the UE 115 may utilize the probabilistic framework (e.g., a feedback transmission probability) for determining whether to transmit the feedback for the received transmission. The feedback transmission probability may be based on the distance between the UE 115 and the transmitting device (e.g., another UE), a congestion level, one or more thresholds (e.g., distance or congestion level threshold), etc. These scenarios may be utilized when the transmission scheduled to be received is a feedback for another transmission by the UE.

Figure 3:
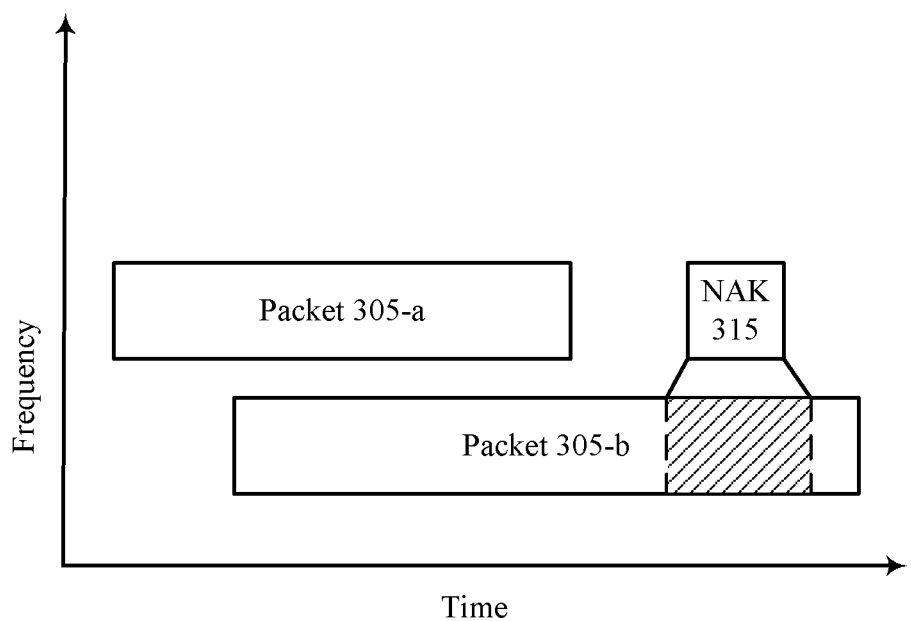
FIG. 3 illustrates an example of a frequency graph that illustrates priority-based feedback triggering in accordance with aspects of the present disclosure.

FIG. 3 illustrates an example of a frequency graph 300 that illustrates priority-based feedback triggering in accordance with aspects of the present disclosure. In some examples, the frequency graph 300 may illustrate aspects of wireless communication system 100. More particularly, the frequency graph 300 illustrates receipt, by a UE 115, of a packet 305-a subject to a transmission decode failure, and a packet 305—during the time when a NAK 315 corresponding to the packet 305-a is scheduled to be transmitted. The packet 305-a is received via a first frequency resource and the packet 305-b is received via a second resource.

In some cases, the UE 115 operates in half duplex and may not be able to transmit and receive during the same period. Accordingly, if the NAK 315 is transmitted during receipt of the packet 305, then the packet 305-b may be punctured, and data corresponding to packet a 305-b may be lost. Further because transition from reception to transmission mode (rx to tx turnaround) and transition from transmission to reception mode (tx to rx turnaround) by a UE 115 may take some amount of time, the amount of data loss for packet 305-b is more than the resources corresponding to the NAK 315. For example, if the NAK 315 is transmitted during one symbol, then the packet 305-b may be punctured by three symbols (e.g., one symbol for tx to rx turnaround, one symbol for the NAK 315, and one symbol for the rx to tx turnaround).

In some cases, if the packet 305-b, which may be punctured by the NAK 315, is long enough, then the packet 305-b may decodable by the UE 115 even if the NAK 315 is transmitted without incurring significant degradation in performance. However, if the packet 305-b is short (e.g., 1 TTI packet with 14 symbols) and the packet 305-b is punctured by three symbols, then the packet 305-b may be lost due to transmission of the NAK 315.

The UE 115 may consider priority levels associated with the packets 305 to determine whether to transmit the NAK 315. For example, if the packet 305-a has a higher priority than packet 305-b, then the UE 115 may determine to transmit the NAK 315. If the packet 305-a has a lower priority than packet 305-b, then the UE 115 may determine to avoid transmitting the NAK or may estimate a decoding performance for decoding the packet 305-b if NAK 315 is transmitted during receipt of the packet 305-b. If the UE 115 determines that it is able to decode the packet 305-b and transmit the NAK 315, then the UE 115 may determine to transmit the NAK 315. If the UE 115 determines that it may not be able to decode the packet 305-*b* if the NAK 315 is transmitted, then the UE 115 may determine to avoid transmission of the NAK 315.

If the UE 115 determines that the priority level associated with the packet 305-*a* is equivalent to the priority level associated with the packet 305-*b*, then the UE 115 may determine the signal condition that caused the transmission decode failure associated with the packet 305-*a* to determine whether to transmit the NAK 315. Dependent on the determined signal condition, the UE 115 may apply a probabilistic framework (e.g., if the signal condition is associated with signal interference) to determine whether to transmit the NAK 315 or consider a distance or congestion level threshold (e.g., if the signal condition is associated with a source other than signal interference) to determine whether to transmit the NAK 315. In some cases, the distance or congestion level threshold is dependent on a QoS requirement associated with the packet, and the QoS requirement may be indicated by a Q5I. In some cases, a distance threshold may be dependent on the congestion level of the system. For example, the UE 115 may determine the congestion level, and if the UE 115 determines that the system is congested, the UE 115 may determine to lower the distance threshold for triggering a NAK.

In some scenarios, the UE 115 may consider the signal condition causing the transmission decode failure if there are no conflicting packets. For example, if the UE 115 receives the packet 305-*a* and the packet 305-*a* is subject to a transmission decode failure, the UE 115 may determine the signal conditions the transmission decode failure and send the NAK using a probabilistic framework or based on consideration of a threshold, as described herein. Such a scenario may be considered in a broadcast or multicast environment.

In some cases, UE 115 may consider more than two packets 305. For example, two received packets may be subject to a transmission decode failure, and the UE 115 may consider puncturing of the third packet (e.g., packet 305-*b*) scheduled to be received during the time the NAKs 315 are scheduled to be sent. Thus, the third packet may be punctured by NAK transmissions twice. The UE 115 may consider such scenarios when determining whether to send the NAKs 315 during receipt of the third packet.

The aspects described with respect to FIG. 3 may be further applicable when for transmissions rather than one or more data packets 305. In such cases, the priority levels associated with the transmissions may be considered in determining to transmit a feedback, which may be a NAK 315. The UE 115 may transmit or determine to not transmit the feedback based on the priority levels. If the priority levels correspond, then the UE 115 may use the probabilistic framework to determine whether to transmit the feedback (e.g., NAK 315).

Figure 4:
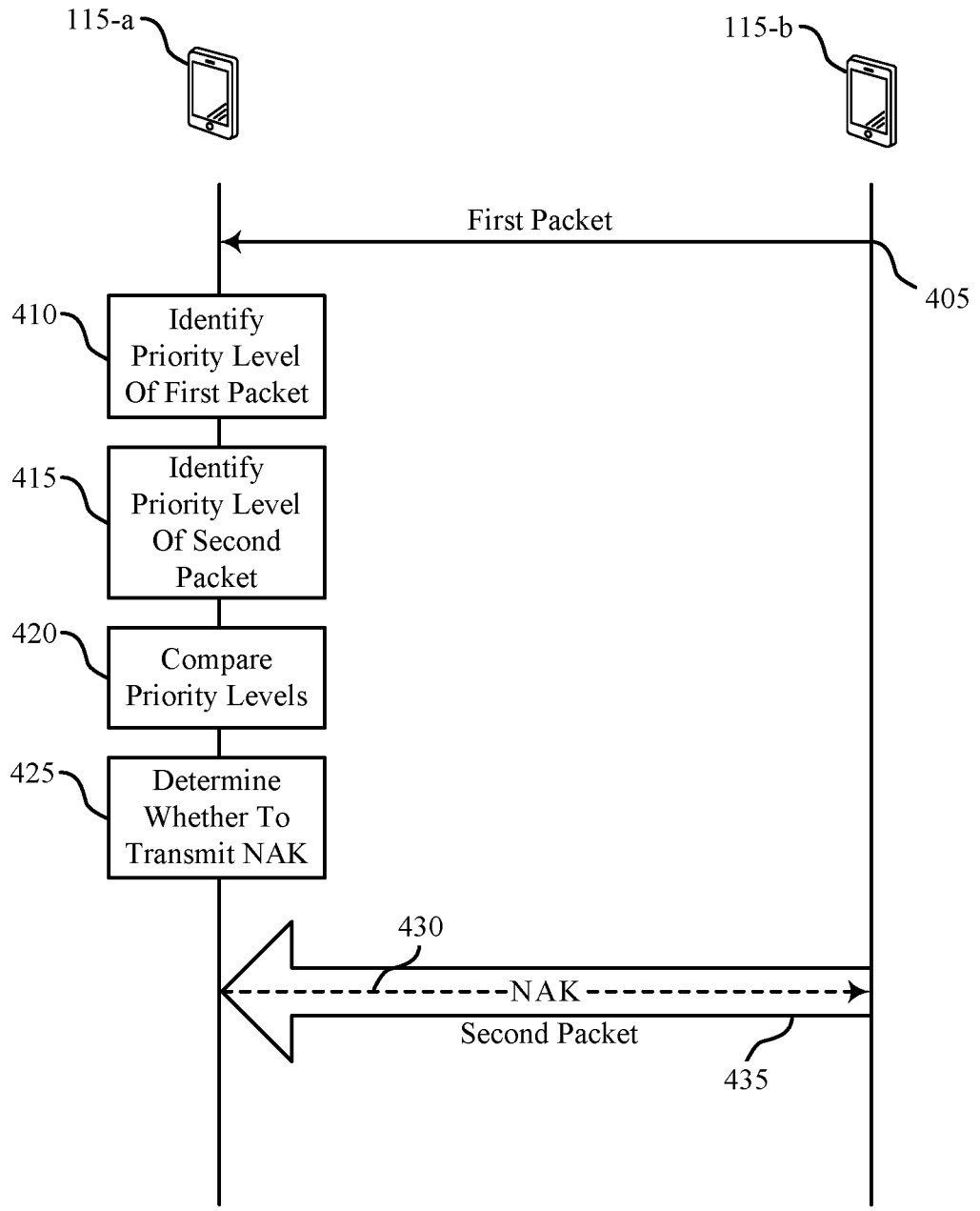
FIG. 4 illustrates an example of a process flow diagram that supports priority-based feedback triggering in accordance with aspects of the present disclosure.

FIG. 4 illustrates an example of a process flow 400 that supports priority-based feedback triggering in accordance with aspects of the present disclosure. In some examples, process flow 400 may implement aspects of wireless communication system 100. Process flow 400 includes UE 115-*a* and UE 115-*b*, but it should be understood that aspects of the process flow 400 are applicable to communications between UEs 115 and a base station 105. In some examples, UEs 115 may be vehicles participating in vehicle-to-everything (V2X) broadcast or multicast transmissions.

At 405 the UE 115-*b* (e.g., a transmitting device) broadcasts or multicast a first packet (or transmission) to two or more UEs including the UE 115-*a* (e.g., via P2P or D2D protocols). The first packet/transmission may be transmitted to the UE 115-*a* using a first frequency resource. In some cases, the UE 115-*a* is operating in half duplex. The UE 115-*a* determines that the first packet is subject to a transmission decode failure (or other feedback condition). In some cases, the UE 115-*a* may determine that the transmission is subject to the feedback condition because the UE 115-*a* is unable to decode or does not recognize the first packet.

At 410, the UE 115-*a* identifies a first priority level of the first packet subject to the transmission decode failure. The first priority level may be identified based on a QoS indicator such as a 5QI. In some examples, at 410, the UE 115-*a* identifies a first priority level of a first transmission subject to a feedback condition.

At 415, the UE 115-*a* identifies a second priority level of the second packet. The second packed may be scheduled to be received at a time that the UE 115-*a* is scheduled to transmit a NAK for the first packet. The second priority level may be identified based on a QoS indicator such as a 5QI. In some examples, at 415, the UE 115-*a* identifies a second priority level of a second transmission that is scheduled to be received at the time that the UE 115-*a* is scheduled to transmit feedback for the first transmission.

At 420, the UE 115-*a* compares the first priority level with the second priority level. The comparison may determine whether the first priority level is greater than the second, the second is greater than the first, or that the first and second priority levels correspond (e.g., equal or equivalent).

At 425, the UE 115-*a* determines whether to transmit the NAK associated with the first packet based at least on the comparison. For example, if the first priority level is greater than the second priority level, then the UE 115-*a* may determine to transmit the NAK during the time that the UE 115-*a* is scheduled to receive the second packet. If the second priority level is greater than the first priority level, then the UE 115-*a* may determine to avoid transmission of the NAK or determine to transmit the NAK on an estimated decoding performance associated with transmission of the NAK during receipt of the second packet. For example, if the UE 115-*a* determines that it may be able to decode the second packet if the NAK is transmitted during receipt of the second packet, then the UE 115-*a* may determine to transmit the NAK. On the other hand, if the UE 115-*a* determines that it may not be able to decode the second packet if the NAK is transmitted during receipt of the second packet, then the UE 115-*a* may determine to avoid transmission of the NAK. If the UE 115 determines that the first priority level and the second priority level are corresponding, then the UE 115-*a* may identify a signal condition from which the transmission decode failure arises, and the signal condition may indicate at least whether the transmission decode failure is caused by signal interference. In some implementations, the UE 115-identifies the signal condition by a control decoding process or based on a RSRP or RSRQ measurement relative to a threshold. The UE 115-*a* may determine whether to transmit the NAK based on the signal condition. In some cases, the UE 115-*a* determines whether to transmit the NAK based on a NAK transmission probability, a congestion level threshold, a distance threshold, or a combination thereof.

The examples described at 425 may also be utilized with a first and second transmission, where the first transmission is subject to feedback (e.g., ACK or NAK), and the feedback is scheduled to be transmitted when the feedback for the first transmission is scheduled for transmission. In some examples, the second transmission is a feedback transmission corresponding to a transmission sent by the UE 115-*a*.

At 430, the UE 115-a optionally transmits a feedback to the UE 115-b in accordance with the determining. The UE 115-a may transmit a NAK during receipt of the second packet at 435 or may avoid transmission of the NAK during receipt of the second packet at 435 As described herein, if the first priority level is greater than the second priority level, then the UE 115-a may transmit the NAK during the time that the UE 115-a is scheduled to receive the second packet. If the second priority level is greater than the first, the UE 115-a may avoid transmission of the NAK or transmit the NAK based on an estimated decoding performance associated with transmission of the NAK during receipt of the second packet. If the UE 115 determines that the first priority level and the second priority level are corresponding or equivalent, the UE 115 may transmit the NAK or avoid transmission of the based at least in part on the identified signal condition. Accordingly, transmission of the NAK at 430 by the UE 115-a and receipt of the second packet at 435 by the UE 115-a may overlap.

Figure 5:
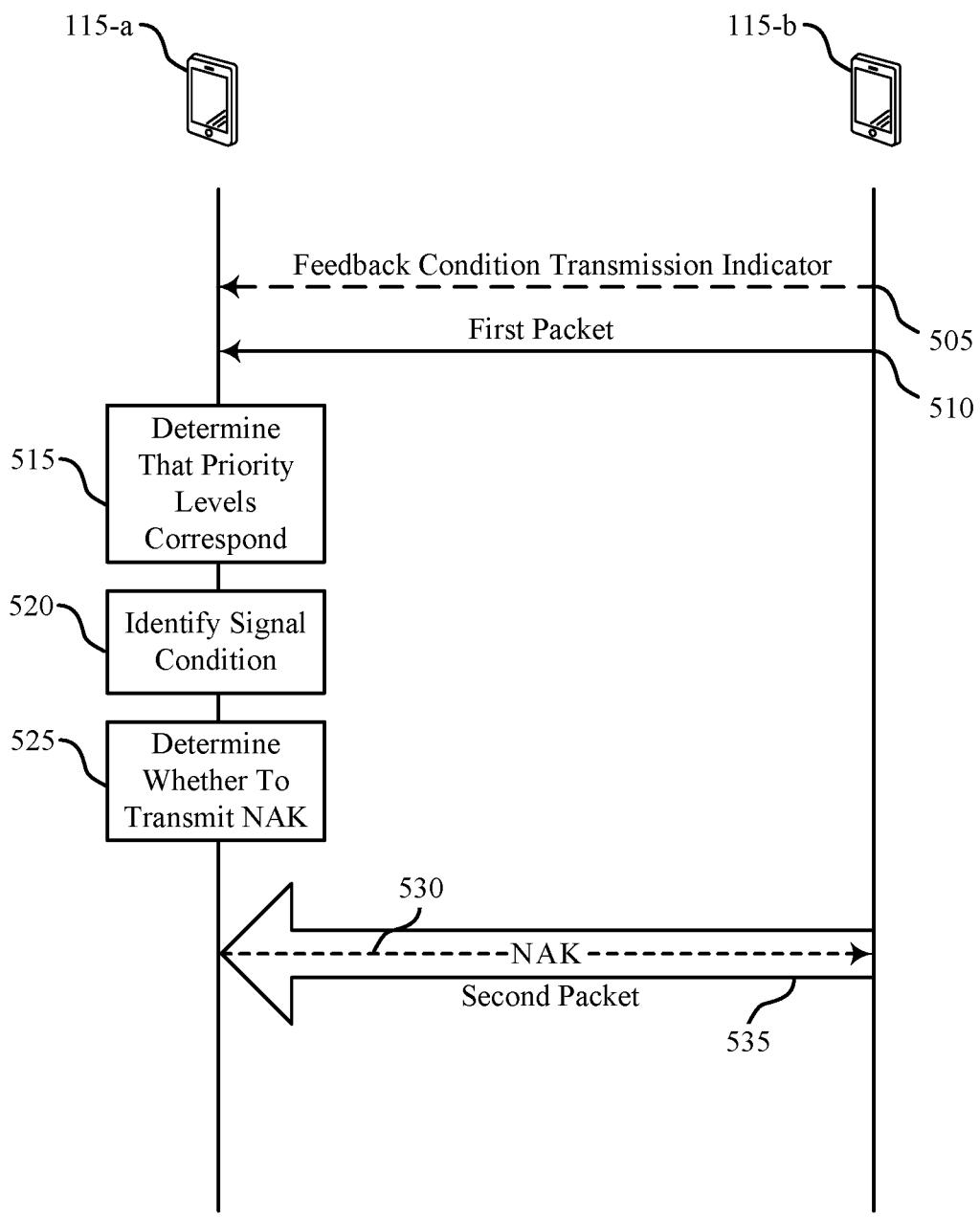
FIG. 5 illustrates an example of a process flow diagram that supports priority-based feedback triggering in accordance with aspects of the present disclosure.

FIG. 5 illustrates an example of a process flow 500 that supports priority-based feedback triggering in accordance with aspects of the present disclosure. In some examples, process flow 500 may implement aspects of wireless communication system 100. Process flow 500 includes UE 115-a and UE 115-b, but it should be understood that aspects of the process flow 500 are applicable to communications between UEs 115 and a base station 105. In some examples, UEs 115 may be vehicles participating in vehicle-to-everything (V2X) broadcast or multicast transmissions.

At 505 the UE 115-b transmits a feedback condition transmission indicator to the UE 115-a. The feedback condition transmission indicator may include an indication of a threshold for considering whether to transmit feedback. In some cases, the feedback condition transmission indicator indicates a distance threshold and/or a congestion level threshold that may be considered when determining whether to transmit feedback (e.g., ACK or NAK). In some cases, the UE 115-a autonomously determines a distance threshold or congestion level threshold.

At 510 the UE 115-b (e.g., a transmitting device) communicates a first packet or transmission to two or more UEs including the UE 115-a (e.g., via P2P or D2D protocols). The first packet may be transmitted to the UE 115-a using a first frequency resource. In some cases, the UE 115-a is operating in half duplex. The UE 115-a determines that the first packet or transmission is subject to a transmission decode failure, because the UE 115-a is unable to decode or does not recognize the first packet.

At 515, the UE 115-a determines that a first priority level corresponding to the first packet, which is subject to a transmission decode failure, corresponds (e.g., equal or equivalent) to a second priority level corresponding to a second packet scheduled to be received during a time when a NAK associated with the first packet is scheduled to be transmitted. The priority levels may be identified based on QoS indicators such as a 5QI.

At 520, responsive to determining that the priority levels of the first packet and the second packet correspond, the UE 115-a identifies the signal condition that is causing the transmission decode failure for the first packet. The signal condition indicates at least whether the transmission decode failure is caused by signal interference. In cases, the UE 115- identifies the signal condition by a control decoding process or based on a RSRP or RSRQ measurement relative to a threshold.

At 525, the UE 115-a determines whether to transmit the NAK associated with the first packet during receipt of the second packet based on the identified signal condition. If the signal condition is caused by signal interference, then the UE 115-a may utilize a feedback transmission probability to determine whether to transmit the feedback. In some cases, the probability is based on a function of a congestion level in the system. The congestion level may be determined by the UE 115-a or may be determined by the UE 115-b, and the function may be determined by the UE 115-a or by the UE 115-b. If the signal condition is a source other than signal interference, then the UE 115-a may consider a distance or congestion level threshold in determining whether to transmit the feedback. The distance threshold may be a function of the congestion level of the system. The congestion level may be determined by the UE 115-a or by the UE 115-b and indicated to the UE 115-a. Further, the function dependent on the congestion level may be determined by the UE 115-b or by the UE 115-a.

At 530, the UE 115-a optionally transmits a feedback (e.g., NAK) to the UE 115-b in accordance with the determining. The UE 115-a may transmit the NAK during receipt of the second packet at 535 or may avoid transmission of the NAK during receipt of the second packet at 535 Accordingly, transmission of the NAK at 530 by the UE 115-a and receipt of the second packet at 535 by the UE 115-a may overlap.

Figure 6:
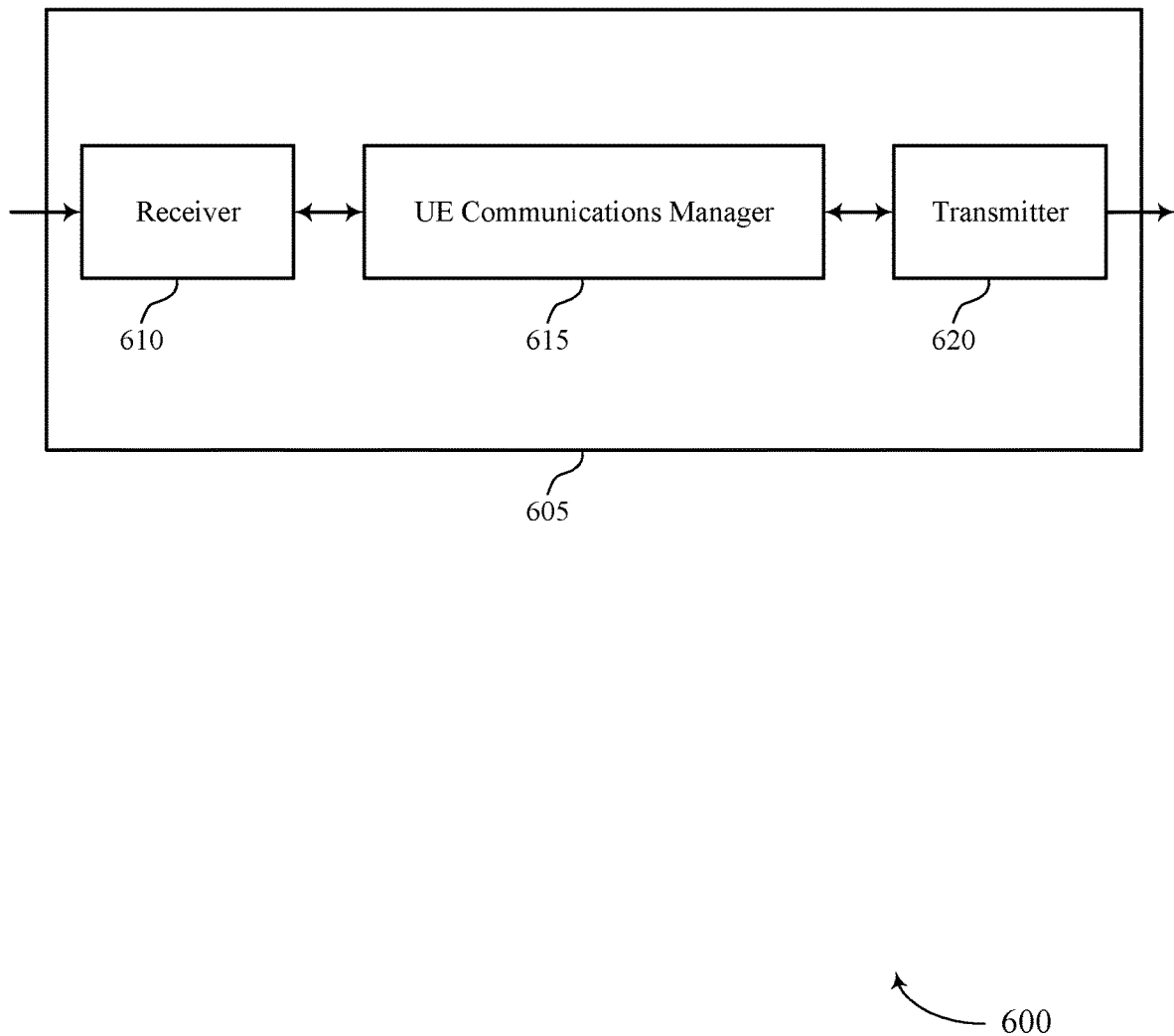
FIGS. 6 and 7 show block diagrams of devices that support priority-based feedback triggering in accordance with aspects of the present disclosure.

FIG. 6 shows a block diagram 600 of a device 605 that supports priority-based feedback triggering in accordance with aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to priority-based feedback triggering, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may identify a first priority level of a first transmission by a transmitting device, where the first transmission is subject to a feedback condition, identify a second priority level associated with a second transmission that is scheduled to be received at the time that the UE is scheduled to transmit feedback for the first packet in accordance with the feedback condition, compare the first priority level with the second priority level, determine whether to transmit the feedback based at least in part on the comparing and on the UE operating in half duplex, and communicate with the transmitting device in accordance with the determining. The UE communications manager 615 may also transmit, to at least one UE via control signaling, a feedback condition transmission indicator, broadcast or multicast a transmission to at least the UE, and receive, from the UE, a NAK associated with the communicated transmission, in accordance with the feedback condition transmission indicator. The communications manager 615 may be an example of aspects of the UE communications manager 910 described herein.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver unit. For example, the transmitter 620 may be an example of aspects of the transceiver 920 described with reference to FIG. 9. The transmitter 620 may utilize a single antenna or a set of antennas.

Figure 7:
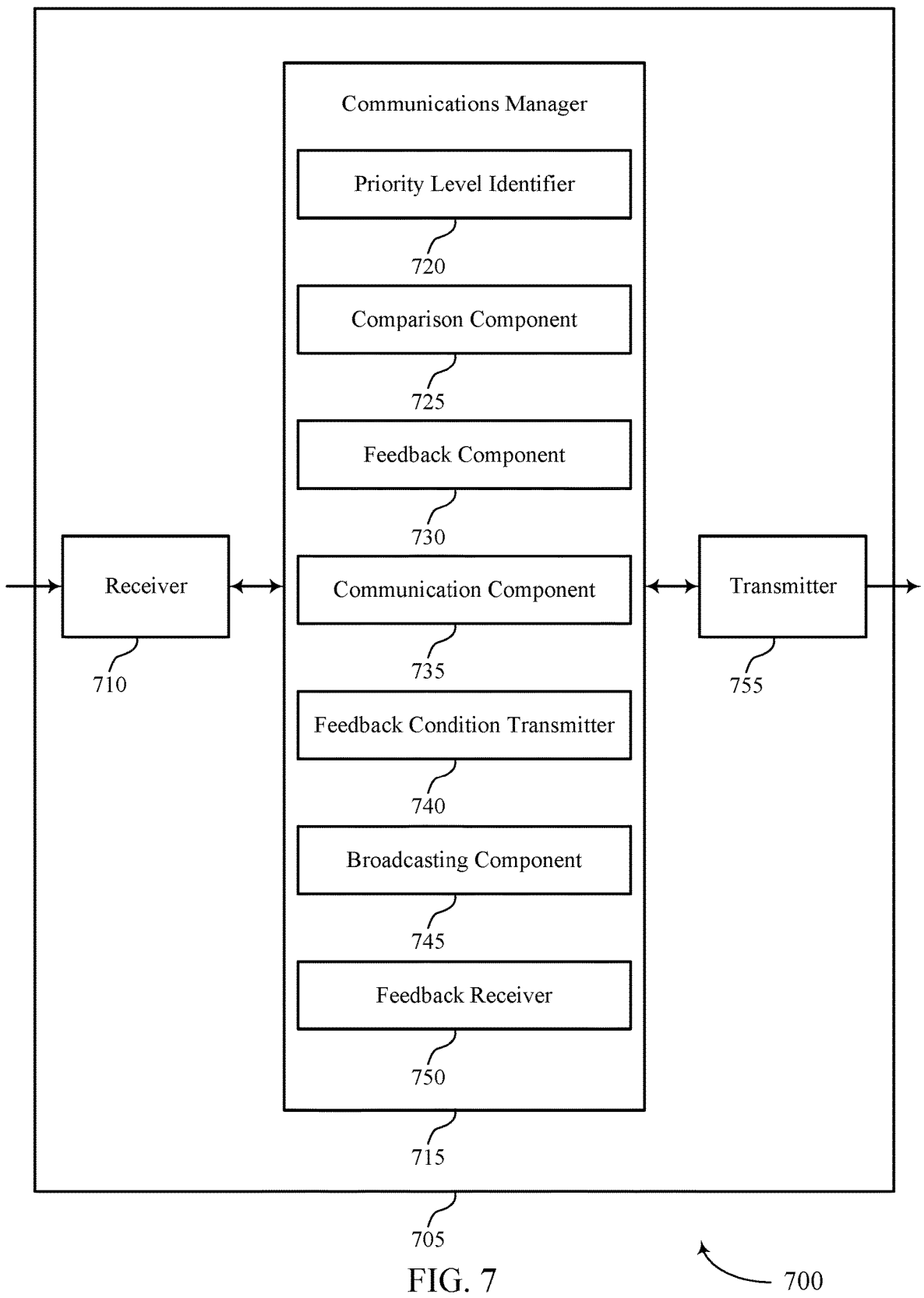

FIG. 7 shows a block diagram 700 of a device 705 that supports priority-based feedback triggering in accordance with aspects of the present disclosure. The device 705 may be an example of aspects of a device 605, or a UE 115 as described herein, and the device 705 may be configured for D2D or V2X communications. The device 705 may include a receiver 710, a UE communications manager 715, and a transmitter 755. The device 705 may also include a processor. Each of these components may be in communication with one another (e.g., via one or more buses).

The receiver 710 may receive information such as packets, user data, or control information associated with various information channels (e.g., control channels, data channels, and information related to priority-based feedback triggering, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a priority level identifier 720, a comparison component 725, a feedback component 730, a communication component 735, a feedback condition transmitter 740, a broadcasting component 745, and a feedback receiver 750. The UE communications manager 715 may be an example of aspects of the UE communications manager 910 described herein.

The priority level identifier 720 may identify a first priority level of a first transmission by a transmitting device, where the first transmission is subject to a feedback condition and identify a second priority level associated with a second transmission that is scheduled to be received at the time that the UE is scheduled to transmit feedback for the first packet in accordance with the feedback condition. In some cases, the priority level identifier 720 may identify the second priority level based at least in part on a priority level associated with a transmission by the UE. In some examples, the second transmission is feedback corresponding to the transmission by the UE.

The comparison component 725 may compare the first priority level with the second priority level. The feedback component 730 may determine whether to transmit the feedback based at least in part on the comparing and on the UE operating in half duplex. The communication component 735 may communicate with the transmitting device in accordance with the determining.

The feedback condition transmitter 740, the broadcasting component 745, and the feedback receiver 750 may be implemented or utilized when the device 705 is a transmitting device or in a transmitting mode. For example, the device 705 may be broadcasting or multicasting in a D2D or V2X scenario. The feedback condition transmitter 740 may transmit via the transmitter 755, to at least one UE via control signaling, a negative acknowledgement (NAK) condition transmission indicator. The broadcasting component 745 may broadcast or multicast a transmission to at least the UE. The feedback receiver 750 may receive, from the UE, a NAK associated with the communicated transmission, in accordance with the feedback condition transmission indicator.

The transmitter 755 may transmit signals generated by other components of the device 705. In some examples, the transmitter 755 may be collocated with a receiver 710 in a transceiver unit. For example, the transmitter 755 may be an example of aspects of the transceiver 920 described with reference to FIG. 9. The transmitter 755 may utilize a single antenna or a set of antennas.

Figure 8:
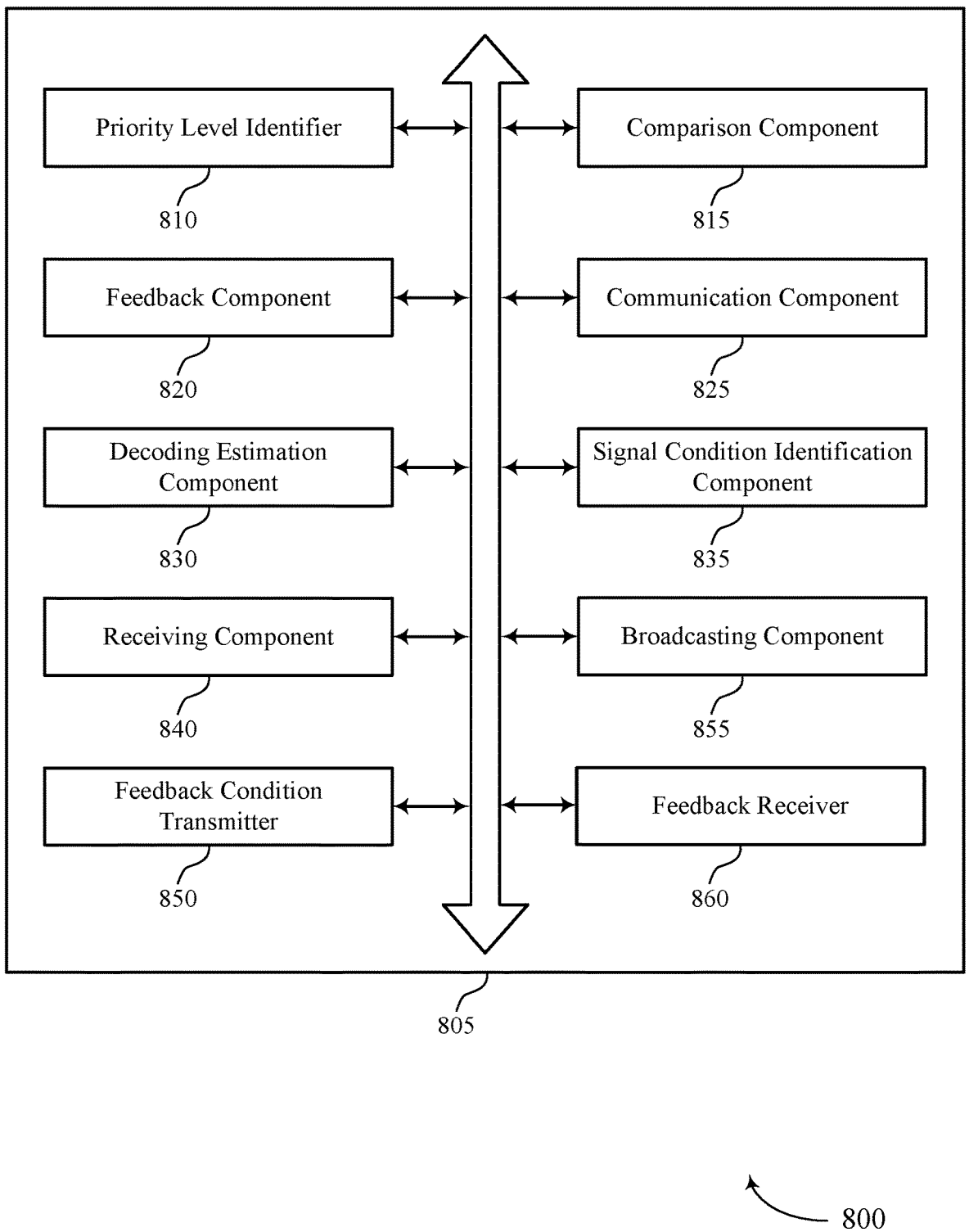
FIG. 8 shows a block diagram of a UE communications manager that supports priority-based feedback triggering in accordance with aspects of the present disclosure.

FIG. 8 shows a block diagram 800 of a UE communications manager 805 that supports priority-based feedback triggering in accordance with aspects of the present disclosure. The UE communications manager 805 may be an example of aspects of a UE communications manager 615, a UE communications manager 715, or a UE communications manager 910 described herein. The UE communications manager 805 may include a priority level identifier 810, a comparison component 815, a feedback component 820, a communication component 825, a decoding estimation component 830, a signal condition identification component 835, a receiving component 840, a feedback condition transmitter 850, a broadcasting component 855, and a feedback receiver 860. Each of these units may communicate, directly or indirectly, with one another (e.g., via one or more buses).

The priority level identifier 810 may identify a first priority level of a first transmission by a transmitting device, where the first transmission is subject to a feedback condition. The first priority level may be identified based on a QoS indicator such as a 5QI.

In some examples, the priority level identifier 810 may identify a second priority level associated with a second transmission that is scheduled to be received at the time that the UE is scheduled to transmit feedback for the first packet in accordance with the feedback condition. The second priority level may be identified based on a QoS indicator such as a 5QI.

The comparison component 815 may compare the first priority level with the second priority level. In some examples, the comparison component 815 may determine that the first priority level is greater than the second priority level based on the comparing. In some examples, the comparison component 815 may determine that the first priority level is less than the second priority level based on the comparing. In some examples, the comparison component

815 may determine that the first priority level corresponds to the second priority level based on the comparing.

The decoding estimation component 830 may estimate a decoding performance associated with receipt of the second packet that would result from transmission of the feedback for the first transmission during the time that the second transmission is scheduled to be received.

The signal condition identification component 835 may identify a signal condition from which the NAK arises, where the signal condition indicates at least whether the NAK is caused by signal interference. The signal condition identification component 835 may identify a signal condition from which the NAK arises, where the signal condition indicates at least whether the NAK is caused by signal interference. In some examples, the signal condition identification component 835 may identify that the signal condition is caused by the signal interference. In some examples, the signal condition identification component 835 may identify a source other than signal interference from which the NAK arises. In some examples, the signal condition identification component 835 may determine the congestion level threshold at the UE. In some examples, the signal condition identification component 835 may receive the congestion level threshold from the transmitting device. In some examples, the signal condition identification component 835 may determine a measurement for one or both of reference signal received power (RSRP) and reference signal received quality (RSRQ). In some examples, the signal condition identification component 835 may identify whether the measurement is higher than a threshold to identify the signal condition. In some examples, the signal condition identification component 835 may identify that the NAK condition is caused by the signal interference based on the decoding. In some examples, the signal condition identification component 835 may decode a first control signal and a second control signal to identify that the first control signal and the second control signal are subject to interference.

The receiving component 840 may receive the first control signal from a first transmitting device and a second control signal from a second transmitting device, where the first transmitting device and the second transmitting device are determined to satisfy a proximity condition based on the first control signal and the second control signal. As described herein, the signal condition identification component 835 may decode the first and second control signals to determine whether the transmission decode failure is caused by the signal interference.

The feedback component 820 may determine whether to transmit the feedback based at least in part on the comparing and on the UE operating in half duplex. In some examples, the feedback component 820 may determine to transmit the feedback to the transmitting device based at least part on the first priority level being greater than the second priority level. In some examples, the feedback component 820 may determine to avoid transmission of the feedback based on the first priority level being less than the second priority level. In some examples, the feedback component 820 may determine to transmit the feedback for the first transmission during the time based on the decoding performance. In some examples, the feedback component 820 may determine, responsive to the signal interference causing the signal condition, to transmit the NAK to the transmitting device based on a NAK transmission probability. In some examples, the feedback component 820 may determine to transmit the feedback to the transmitting device based on a feedback transmission probability. In some examples, the feedback component 820 may receive, from the transmitting device, sidelink control signaling indicating the NAK or feedback transmission probability. In some cases, the feedback transmission probability is based on a distance between the UE and the transmitting device, a determined congestion level, or a combination thereof In some examples, the feedback component 820 may identify that the first transmission is subject to a NAK in accordance with the feedback condition. In some examples, the feedback component 820 may determine, responsive to the signal condition arising from a source other than signal interference, to transmit the NAK based on a threshold. In some examples, the feedback component 820 may compare a determined congestion level to the threshold, where the determining to transmit the NAK is based on the comparing and where the threshold is a congestion level threshold. In some examples, the feedback component 820 may compare a distance between the UE and the transmitting device to the threshold, where the determining to transmit the NAK is based on the comparing and where the threshold is a distance threshold.

In some cases, the NAK transmission probability is based on a distance between the UE and the transmitting device. In some cases, the NAK transmission probability is based on a determined congestion level. The communication component 825 may communicate with the transmitting device in accordance with the determining.

The feedback condition transmitter 850, the broadcasting component 855, and the feedback receiver 860 may be utilized when the UE is in a transmitting (e.g., broadcasting or multicasting) scenario (e.g., the UE is a transmitting device). In some cases, the feedback condition transmitter, 850, the broadcasting component 855, and the feedback receiver 860 may be implemented in a base station 105. The feedback condition transmitter 850 may transmit, to at least one UE via control signaling, a feedback condition transmission indicator. In some cases, the feedback condition transmission indicator indicates a feedback transmission probability for the UE to determine whether to send the feedback. In some cases, the feedback transmission probability is dependent on a distance between the transmitting device and the UE. In some cases, the feedback transmission probability is dependent on a congestion level. In some cases, the feedback condition transmission indicator indicates a congestion level threshold for the UE to determine whether to send the feedback. The broadcasting component 855 may communicate a transmission to at least the UE. The feedback receiver 860 may receive, from the UE, a feedback associated with the communicated, in accordance with the feedback condition transmission indicator.

Figure 9:
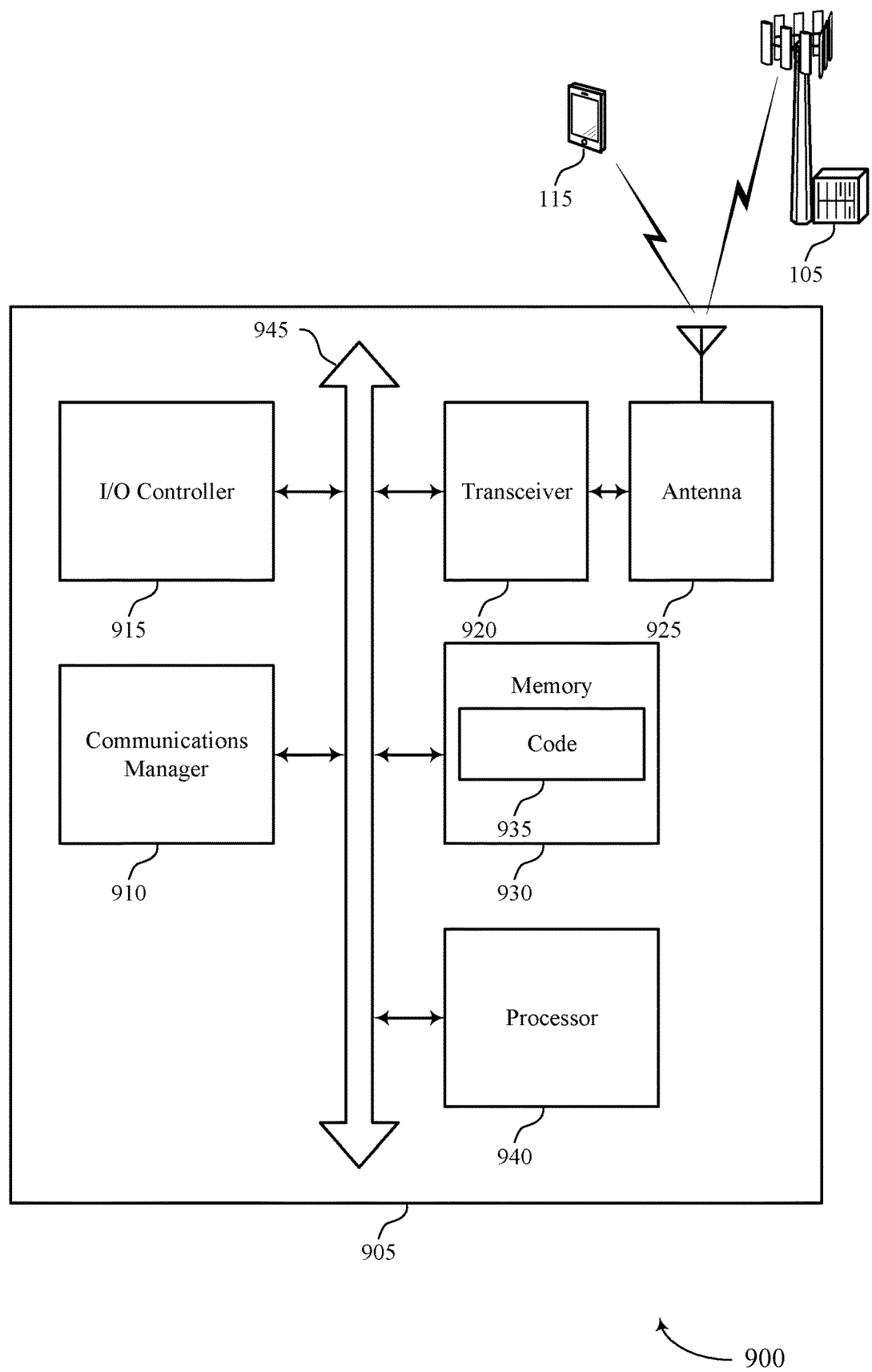
FIG. 9 shows a diagram of a system including a device that supports priority-based feedback triggering in accordance with aspects of the present disclosure.

FIG. 9 shows a diagram of a system 900 including a device 905 that supports priority-based feedback triggering in accordance with aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may identify a first priority level of a first transmission by a transmitting device, where the first transmission is subject to a feedback condition, identify a second priority level associated with a second transmission that is scheduled to be received at the time that the UE is scheduled to transmit feedback for the first packet in accordance with the feedback condition, compare the first priority level with the second priority level, determine whether to transmit the feedback based at least in part on the comparing and on the UE operating in half duplex, and communicate with the transmitting device in accordance with the determining. The UE communications manager 910 may also transmit, to at least one UE via control signaling, a feedback condition transmission indicator, broadcast or multicast a transmission to at least the UE, and receive, from the UE, a NAK associated with the communicated transmission, in accordance with the feedback condition transmission indicator.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a digital signal processor (DSP), a CPU, a microcontroller, an ASIC, an field programmable gate array (FPGA), a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting priority-based feedback triggering).

The code 935 may include instructions to implement aspects of the present disclosure, including instructions to support wireless communication. The code 935 may be stored in a non-transitory computer-readable medium such as system memory or other type of memory. In some cases, the code 935 may not be directly executable by the processor 940 but may cause a computer (e.g., when compiled and executed) to perform functions described herein. In some cases, the system 900 includes similar and various additional components when implemented as a base station 105.

Figure 10:
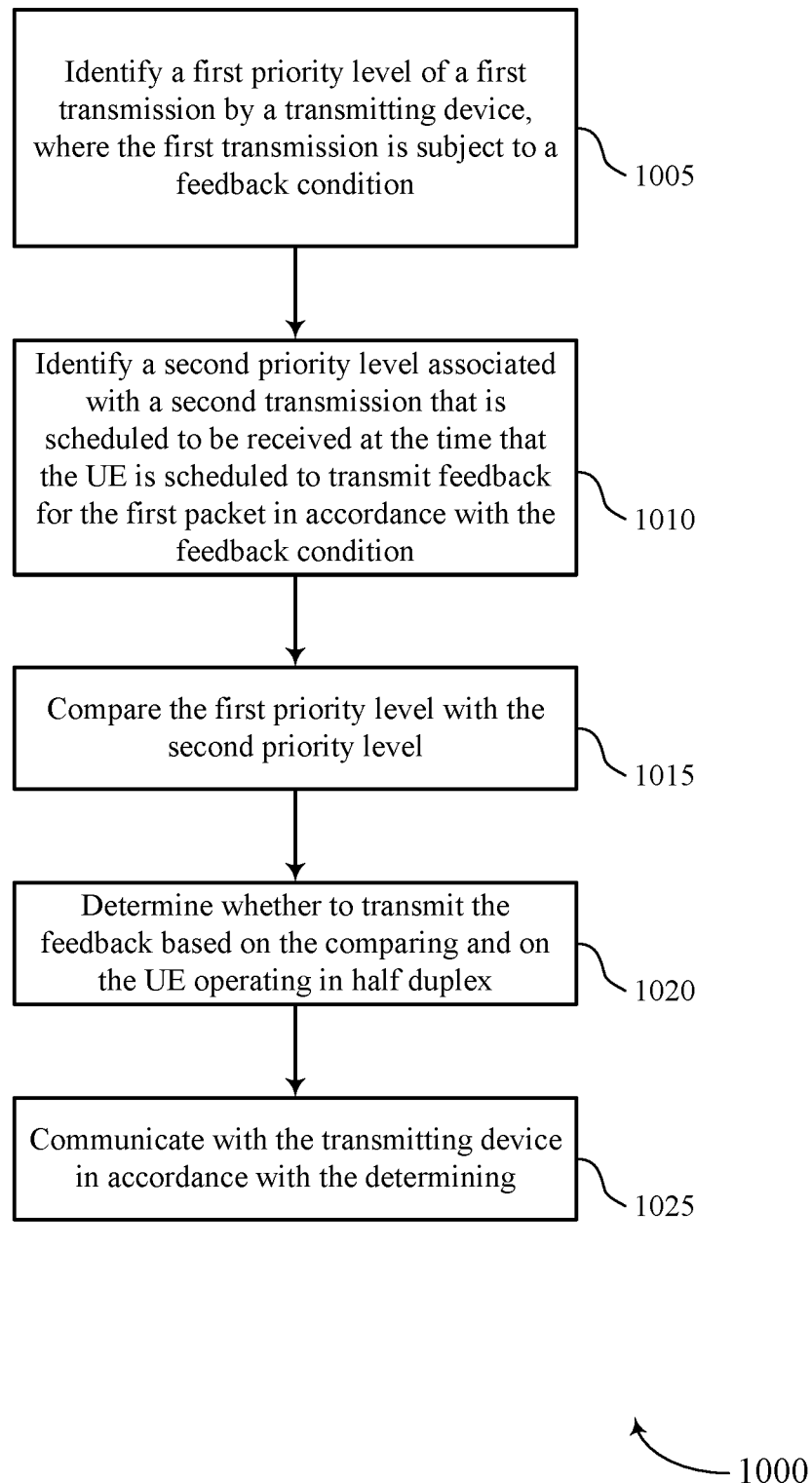
FIGS. 10 through 16 show flowcharts illustrating methods that support priority-based feedback triggering in accordance with aspects of the present disclosure.

FIG. 10 shows a flowchart illustrating a method 1000 that supports priority-based feedback triggering in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1005, the UE may identify a first priority level of a first transmission by a transmitting device, where the first transmission is subject to a feedback condition. The operations of 1005 may be performed according to the methods described herein. In some examples, aspects of the operations of 1005 may be performed by a priority level identifier as described with reference to FIGS. 6 through 9.

At 1010, the UE may identify a second priority level associated with a second transmission that is scheduled to be received at the time that the UE is scheduled to transmit feedback for the first packet in accordance with the feedback condition. The operations of 1010 may be performed according to the methods described herein. In some examples, aspects of the operations of 1010 may be performed by a priority level identifier as described with reference to FIGS. 6 through 9.

At 1015, the UE may compare the first priority level with the second priority level. The operations of 1015 may be performed according to the methods described herein. In some examples, aspects of the operations of 1015 may be performed by a comparison component as described with reference to FIGS. 6 through 9.

At 1020, the UE may determine whether to transmit the feedback based at least in part on the comparing and on the UE operating in half duplex. The operations of 1020 may be performed according to the methods described herein. In some examples, aspects of the operations of 1020 may be performed by a feedback component as described with reference to FIGS. 6 through 9.

At 1025, the UE may communicate with the transmitting device in accordance with the determining. The operations of 1025 may be performed according to the methods described herein. In some examples, aspects of the operations of 1025 may be performed by a communication component as described with reference to FIGS. 6 through 9.

Figure 11:
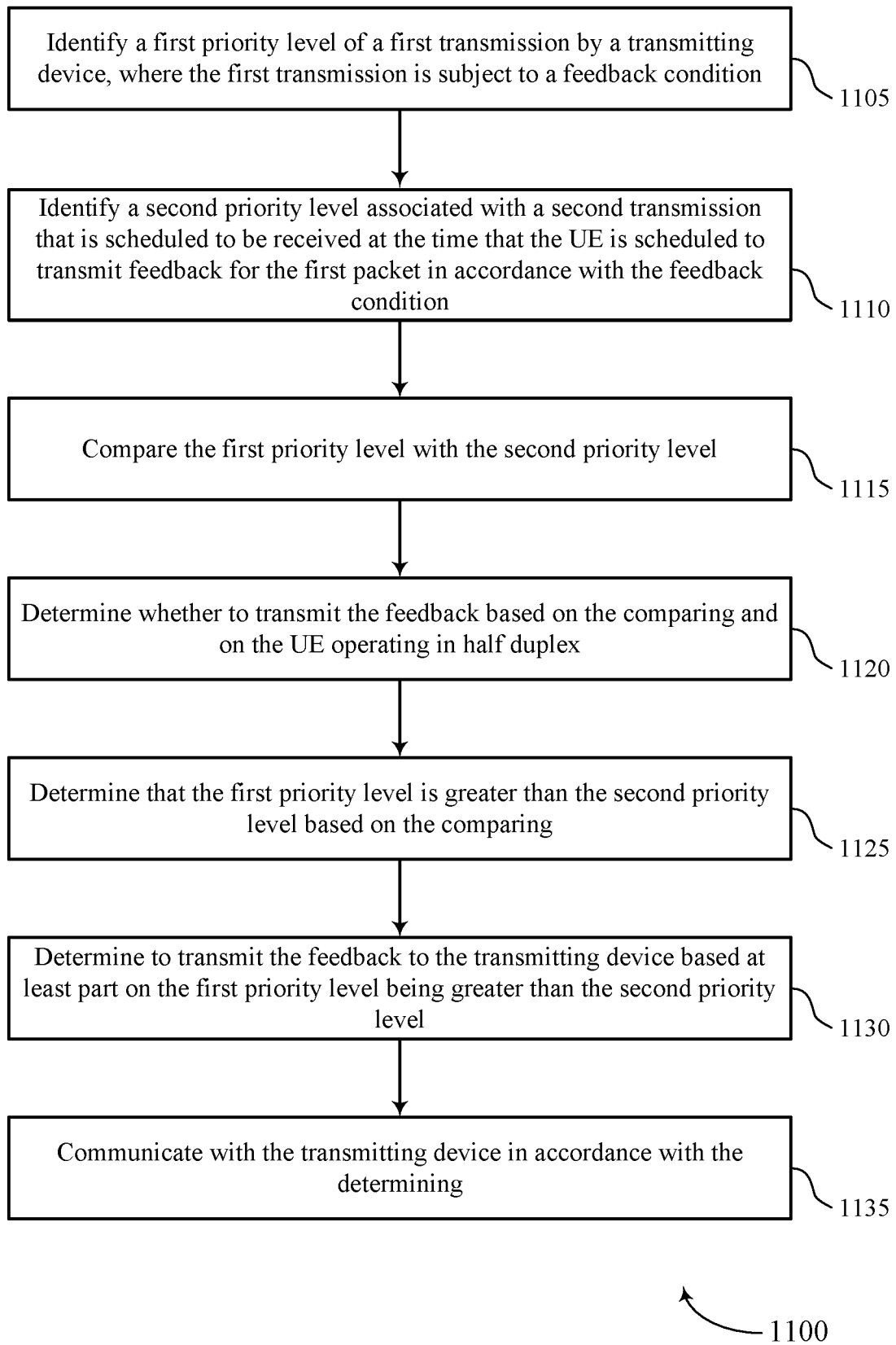

FIG. 11 shows a flowchart illustrating a method 1100 that supports priority-based feedback triggering in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1105, the UE may identify a first priority level of a first transmission by a transmitting device, where the first transmission is subject to a feedback condition. The operations of 1105 may be performed according to the methods described herein. In some examples, aspects of the operations of 1105 may be performed by a priority level identifier as described with reference to FIGS. 6 through 9.

At 1110, the UE may identify a second priority level associated with a second transmission that is scheduled to be received at the time that the UE is scheduled to transmit feedback for the first packet in accordance with the feedback condition. The operations of 1110 may be performed according to the methods described herein. In some examples, aspects of the operations of 1110 may be performed by a priority level identifier as described with reference to FIGS. 6 through 9.

At 1115, the UE may compare the first priority level with the second priority level. The operations of 1115 may be performed according to the methods described herein. In some examples, aspects of the operations of 1115 may be performed by a comparison component as described with reference to FIGS. 6 through 9.

At 1120, the UE may determine whether to transmit the feedback based at least in part on the comparing and on the UE operating in half duplex. The operations of 1120 may be performed according to the methods described herein. In some examples, aspects of the operations of 1120 may be performed by a feedback component as described with reference to FIGS. 6 through 9.

At 1125, the UE may determine that the first priority level is greater than the second priority level based on the comparing. The operations of 1125 may be performed according to the methods described herein. In some examples, aspects of the operations of 1125 may be performed by a comparison component as described with reference to FIGS. 6 through 9.

At 1130, the UE may determine to transmit the feedback to the transmitting device based at least part on the first priority level being greater than the second priority level. The operations of 1130 may be performed according to the methods described herein. In some examples, aspects of the operations of 1130 may be performed by a feedback component as described with reference to FIGS. 6 through 9.

At 1135, the UE may communicate with the transmitting device in accordance with the determining. The operations of 1135 may be performed according to the methods described herein. In some examples, aspects of the operations of 1135 may be performed by a communication component as described with reference to FIGS. 6 through 9.

Figure 12:
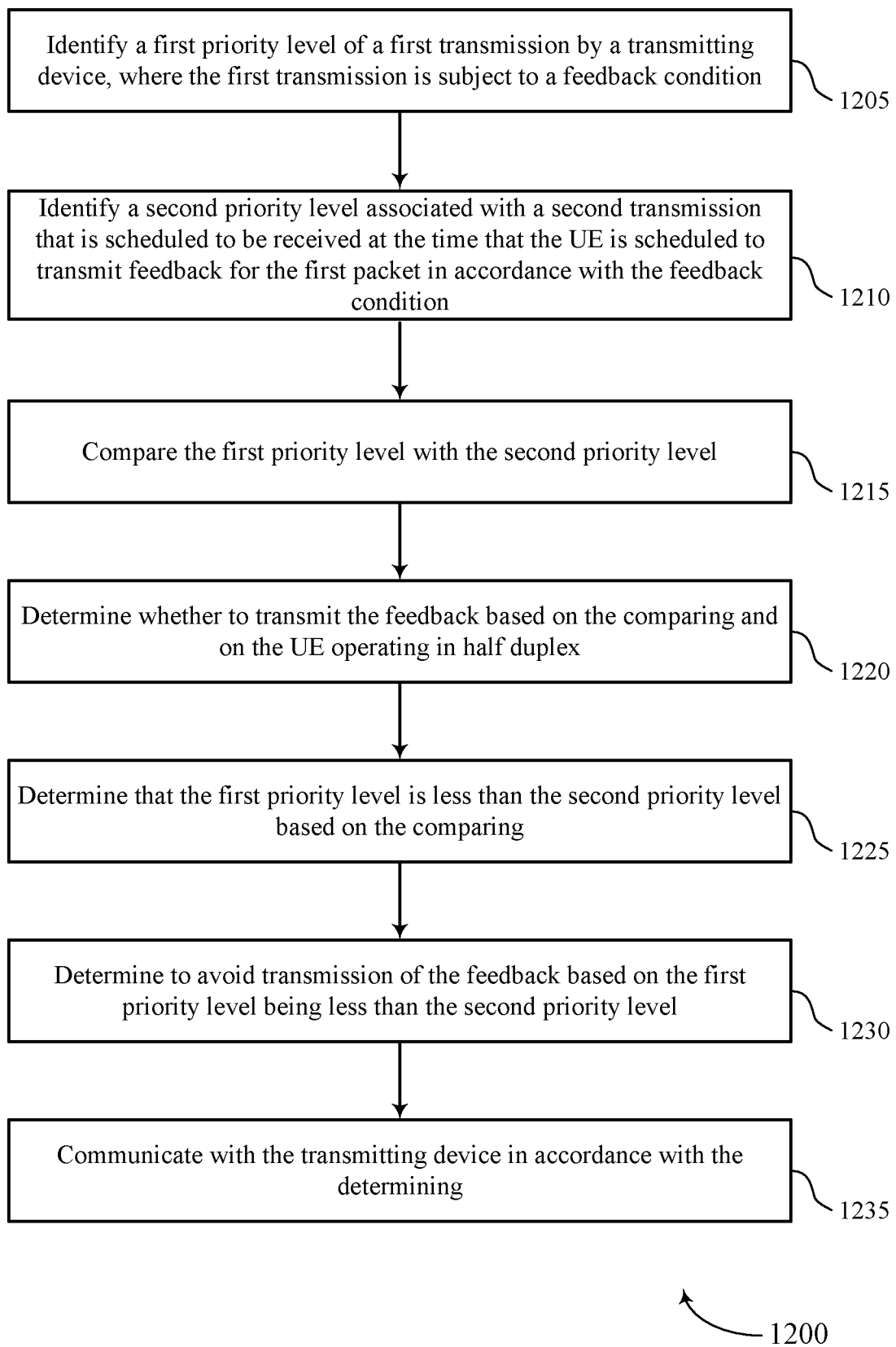

FIG. 12 shows a flowchart illustrating a method 1200 that supports priority-based feedback triggering in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1205, the UE may identify a first priority level of a first transmission by a transmitting device, where the first transmission is subject to a feedback condition. The operations of 1205 may be performed according to the methods described herein. In some examples, aspects of the operations of 1205 may be performed by a priority level identifier as described with reference to FIGS. 6 through 9.

At 1210, the UE may identify a second priority level associated with a second transmission that is scheduled to be received at the time that the UE is scheduled to transmit feedback for the first packet in accordance with the feedback condition. The operations of 1210 may be performed according to the methods described herein. In some examples, aspects of the operations of 1210 may be performed by a priority level identifier as described with reference to FIGS. 6 through 9.

At 1215, the UE may compare the first priority level with the second priority level. The operations of 1215 may be performed according to the methods described herein. In some examples, aspects of the operations of 1215 may be performed by a comparison component as described with reference to FIGS. 6 through 9.

At 1220, the UE may determine whether to transmit the feedback based at least in part on the comparing and on the UE operating in half duplex. The operations of 1220 may be performed according to the methods described herein. In some examples, aspects of the operations of 1220 may be performed by a feedback component as described with reference to FIGS. 6 through 9.

At 1225, the UE may determine that the first priority level is less than the second priority level based on the comparing. The operations of 1225 may be performed according to the methods described herein. In some examples, aspects of the operations of 1225 may be performed by a comparison component as described with reference to FIGS. 6 through 9.

At 1230, the UE may determine to avoid transmission of the feedback based on the first priority level being less than the second priority level. The operations of 1230 may be performed according to the methods described herein. In some examples, aspects of the operations of 1230 may be performed by a feedback component as described with reference to FIGS. 6 through 9.

At 1235, the UE may communicate with the transmitting device in accordance with the determining. The operations of 1235 may be performed according to the methods described herein. In some examples, aspects of the operations of 1235 may be performed by a communication component as described with reference to FIGS. 6 through 9.

Figure 13:
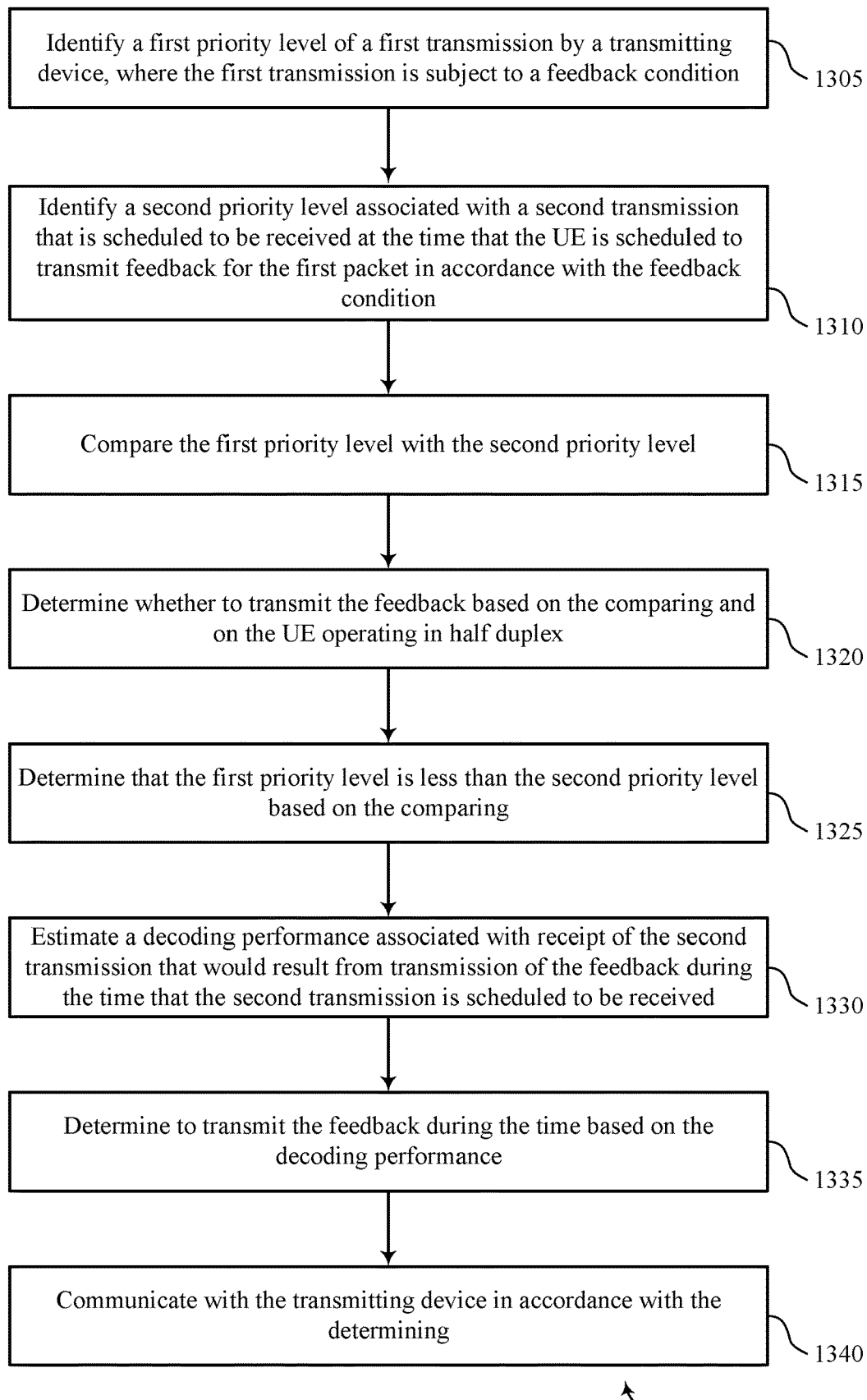

FIG. 13 shows a flowchart illustrating a method 1300 that supports priority-based feedback triggering in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1305, the UE may identify a first priority level of a first transmission by a transmitting device, where the first transmission is subject to a feedback condition. The operations of 1305 may be performed according to the methods described herein. In some examples, aspects of the operations of 1305 may be performed by a priority level identifier as described with reference to FIGS. 6 through 9.

At 1310, the UE may identify a second priority level associated with a second transmission that is scheduled to be received at the time that the UE is scheduled to transmit feedback for the first packet in accordance with the feedback condition. The operations of 1310 may be performed according to the methods described herein. In some examples, aspects of the operations of 1310 may be performed by a priority level identifier as described with reference to FIGS. 6 through 9.

At 1315, the UE may compare the first priority level with the second priority level. The operations of 1315 may be performed according to the methods described herein. In some examples, aspects of the operations of 1315 may be performed by a comparison component as described with reference to FIGS. 6 through 9.

At 1320, the UE may determine whether to transmit the feedback based at least in part on the comparing and on the UE operating in half duplex. The operations of 1320 may be performed according to the methods described herein. In some examples, aspects of the operations of 1320 may be performed by a feedback component as described with reference to FIGS. 6 through 9.

At 1325, the UE may determine that the first priority level is less than the second priority level based on the comparing. The operations of 1325 may be performed according to the methods described herein. In some examples, aspects of the operations of 1325 may be performed by a comparison component as described with reference to FIGS. 6 through 9.

At 1330, the UE may estimate a decoding performance associated with receipt of the second transmission that would result from transmission of the feedback during the time that the second transmission is scheduled to be received. The operations of 1330 may be performed according to the methods described herein. In some examples, aspects of the operations of 1330 may be performed by a decoding estimation component as described with reference to FIGS. 6 through 9.

At 1335, the UE may determine to transmit the feedback during the time based on the estimated decoding performance. The operations of 1335 may be performed according to the methods described herein. In some examples, aspects of the operations of 1335 may be performed by a feedback component as described with reference to FIGS. 6 through 9.

At 1340, the UE may communicate with the transmitting device in accordance with the determining. The operations of 1340 may be performed according to the methods described herein. In some examples, aspects of the operations of 1340 may be performed by a communication component as described with reference to FIGS. 6 through 9.

Figure 14:
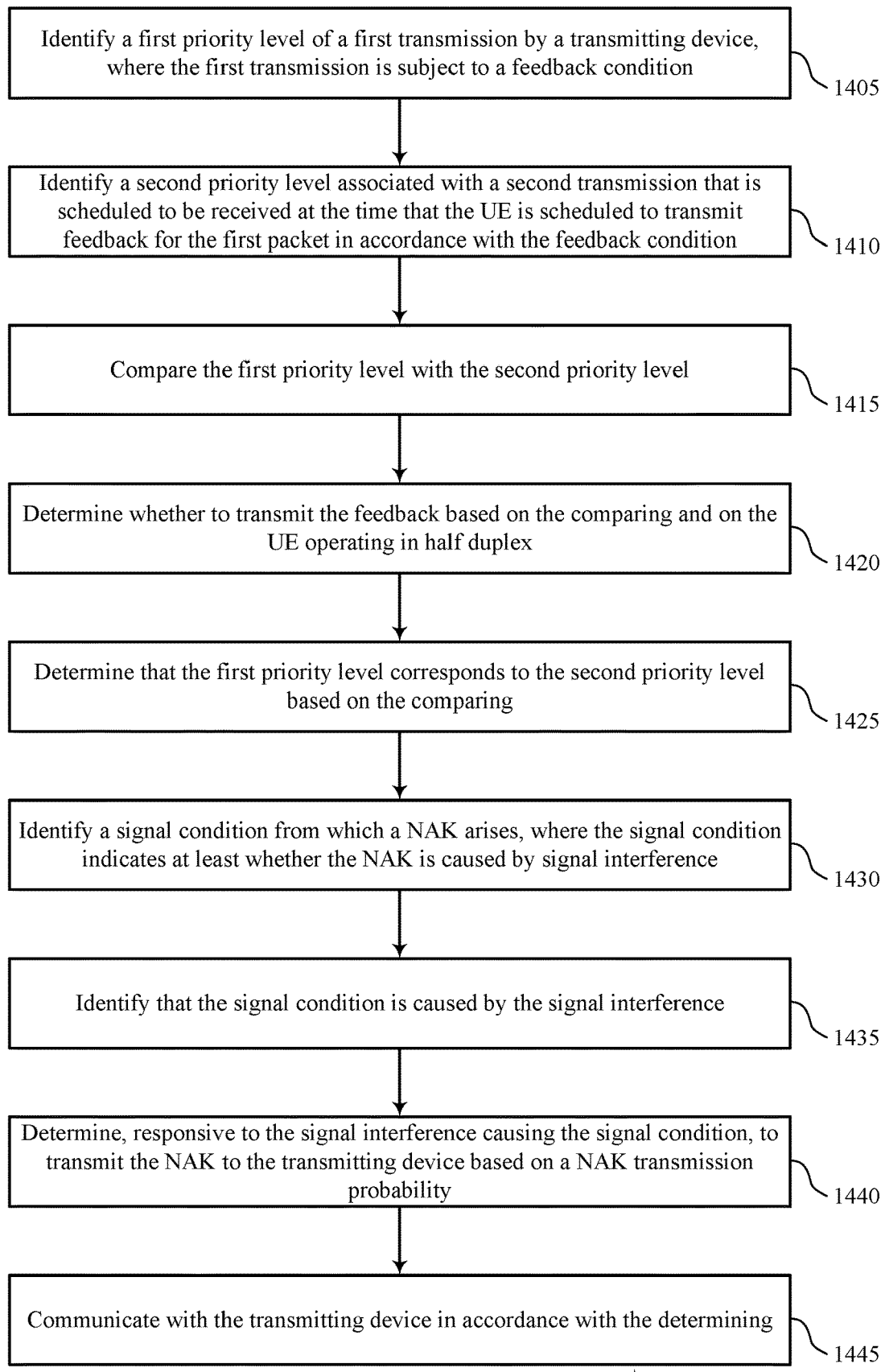

FIG. 14 shows a flowchart illustrating a method 1400 that supports priority-based feedback triggering in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may identify a first priority level of a first transmission by a transmitting device, where the first transmission is subject to a feedback condition. The operations of 1405 may be performed according to the methods described herein. In some examples, aspects of the operations of 1405 may be performed by a priority level identifier as described with reference to FIGS. 6 through 9.

At 1410, the UE may identify a second priority level associated with a second transmission that is scheduled to be received at the time that the UE is scheduled to transmit feedback for the first packet in accordance with the feedback condition. The operations of 1410 may be performed according to the methods described herein. In some examples, aspects of the operations of 1410 may be performed by a priority level identifier as described with reference to FIGS. 6 through 9.

At 1415, the UE may compare the first priority level with the second priority level. The operations of 1415 may be performed according to the methods described herein. In some examples, aspects of the operations of 1415 may be performed by a comparison component as described with reference to FIGS. 6 through 9.

At 1420, the UE may determine whether to transmit the feedback based at least in part on the comparing and on the UE operating in half duplex. The operations of 1420 may be performed according to the methods described herein. In some examples, aspects of the operations of 1420 may be performed by a feedback component as described with reference to FIGS. 6 through 9.

At 1425, the UE may determine that the first priority level corresponds to the second priority level based on the comparing. The operations of 1425 may be performed according to the methods described herein. In some examples, aspects of the operations of 1425 may be performed by a comparison component as described with reference to FIGS. 6 through 9.

At 1430, the UE may identify a signal condition from which a NAK arises, where the signal condition indicates at least whether the NAK is caused by signal interference. The operations of 1430 may be performed according to the methods described herein. In some examples, aspects of the operations of 1430 may be performed by a signal condition identification component as described with reference to FIGS. 6 through 9.

At 1435, the UE may identify that the signal condition is caused by the signal interference. The operations of 1435 may be performed according to the methods described herein. In some examples, aspects of the operations of 1435 may be performed by a signal condition identification component as described with reference to FIGS. 6 through 9.

At 1440, the UE may determine, responsive to the signal interference causing the signal condition, to transmit the NAK to the transmitting device based on a NAK transmission probability. The operations of 1440 may be performed according to the methods described herein. In some examples, aspects of the operations of 1440 may be performed by a feedback component as described with reference to FIGS. 6 through 9.

At 1445, the UE may communicate with the transmitting device in accordance with the determining. The operations of 1445 may be performed according to the methods described herein. In some examples, aspects of the operations of 1445 may be performed by a communication component as described with reference to FIGS. 6 through 9.

Figure 15:
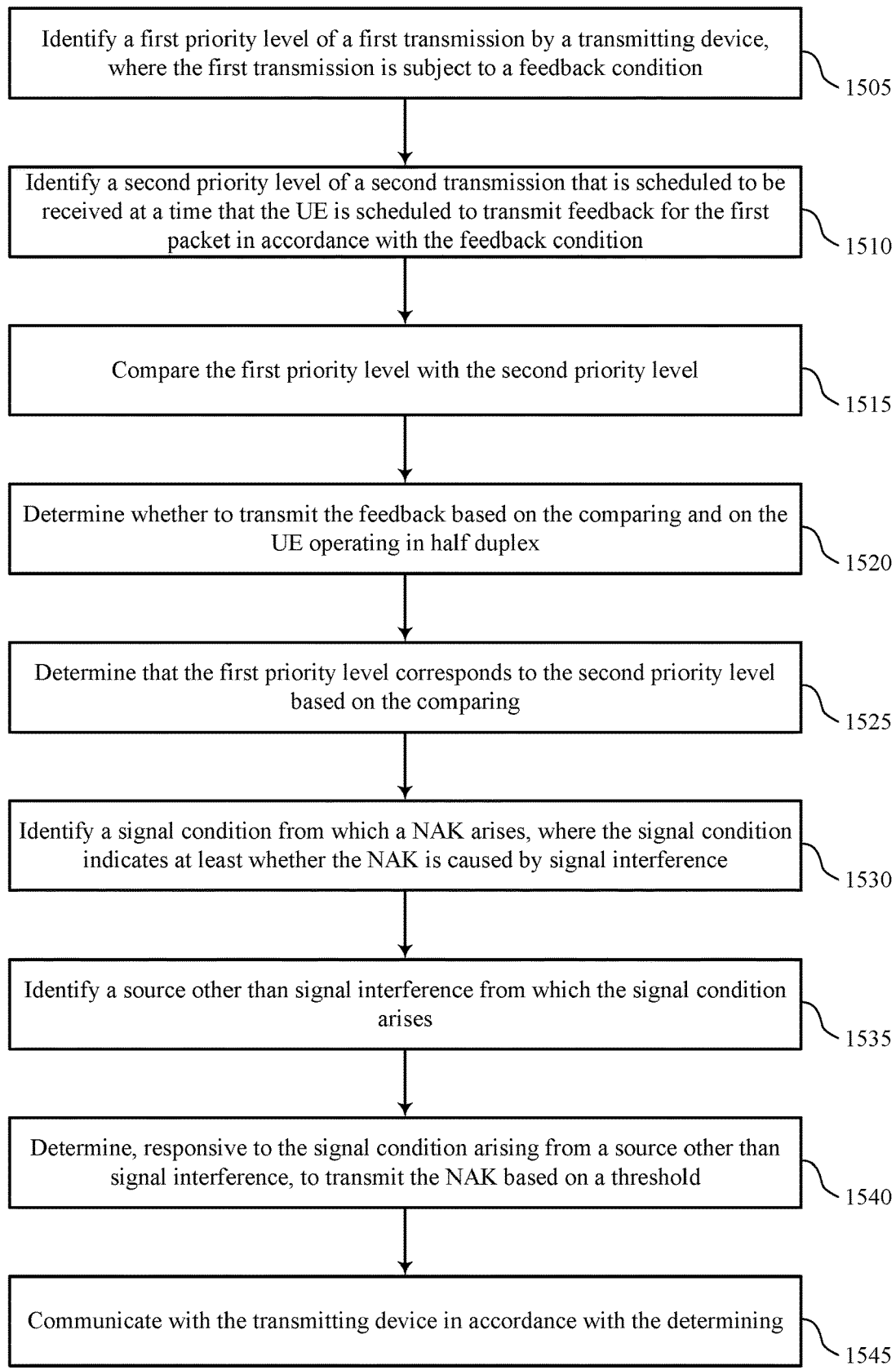

FIG. 15 shows a flowchart illustrating a method 1500 that supports priority-based feedback triggering in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may identify a first priority level of a first transmission by a transmitting device, where the first transmission is subject to a feedback condition. The first priority level may be identified based on a QoS indicator such as a 5QI. The operations of 1505 may be performed according to the methods described herein. In some examples, aspects of the operations of 1505 may be performed by a priority level identifier as described with reference to FIGS. 6 through 9.

At 1510, the UE may identify a second priority level associated with a second transmission that is scheduled to be received at the time that the UE is scheduled to transmit feedback for the first packet in accordance with the feedback condition. The second priority level may be identified based on a QoS indicator such as a 5QI. The operations of 1510 may be performed according to the methods described herein. In some examples, aspects of the operations of 1510 may be performed by a priority level identifier as described with reference to FIGS. 6 through 9.

At 1515, the UE may compare the first priority level with the second priority level. The operations of 1515 may be performed according to the methods described herein. In some examples, aspects of the operations of 1515 may be performed by a comparison component as described with reference to FIGS. 6 through 9.

At 1520, the UE may determine whether to transmit the feedback based at least in part on the comparing and on the UE operating in half duplex. The operations of 1520 may be performed according to the methods described herein. In some examples, aspects of the operations of 1520 may be performed by a feedback component as described with reference to FIGS. 6 through 9.

At 1525, the UE may determine that the first priority level corresponds to the second priority level based on the comparing. The operations of 1525 may be performed according to the methods described herein. In some examples, aspects of the operations of 1525 may be performed by a comparison component as described with reference to FIGS. 6 through 9.

At 1530, the UE may identify a signal condition from which a NAK arises, where the signal condition indicates at least whether the NAK is caused by signal interference. The operations of 1530 may be performed according to the methods described herein. In some examples, aspects of the operations of 1530 may be performed by a signal condition identification component as described with reference to FIGS. 6 through 9.

At 1535, the UE may identify a source other than signal interference from which the NAK arises. The operations of 1535 may be performed according to the methods described herein. In some examples, aspects of the operations of 1535 may be performed by a signal condition identification component as described with reference to FIGS. 6 through 9.

At 1540, the UE may determine, responsive to the NAK signal condition arising from a source other than signal interference, to transmit the NAK based on a threshold. The operations of 1540 may be performed according to the methods described herein. In some examples, aspects of the operations of 1540 may be performed by a feedback component as described with reference to FIGS. 6 through 9.

At 1545, the UE may communicate with the transmitting device in accordance with the determining. The operations of 1545 may be performed according to the methods described herein. In some examples, aspects of the operations of 1545 may be performed by a communication component as described with reference to FIGS. 6 through 9.

Figure 16:
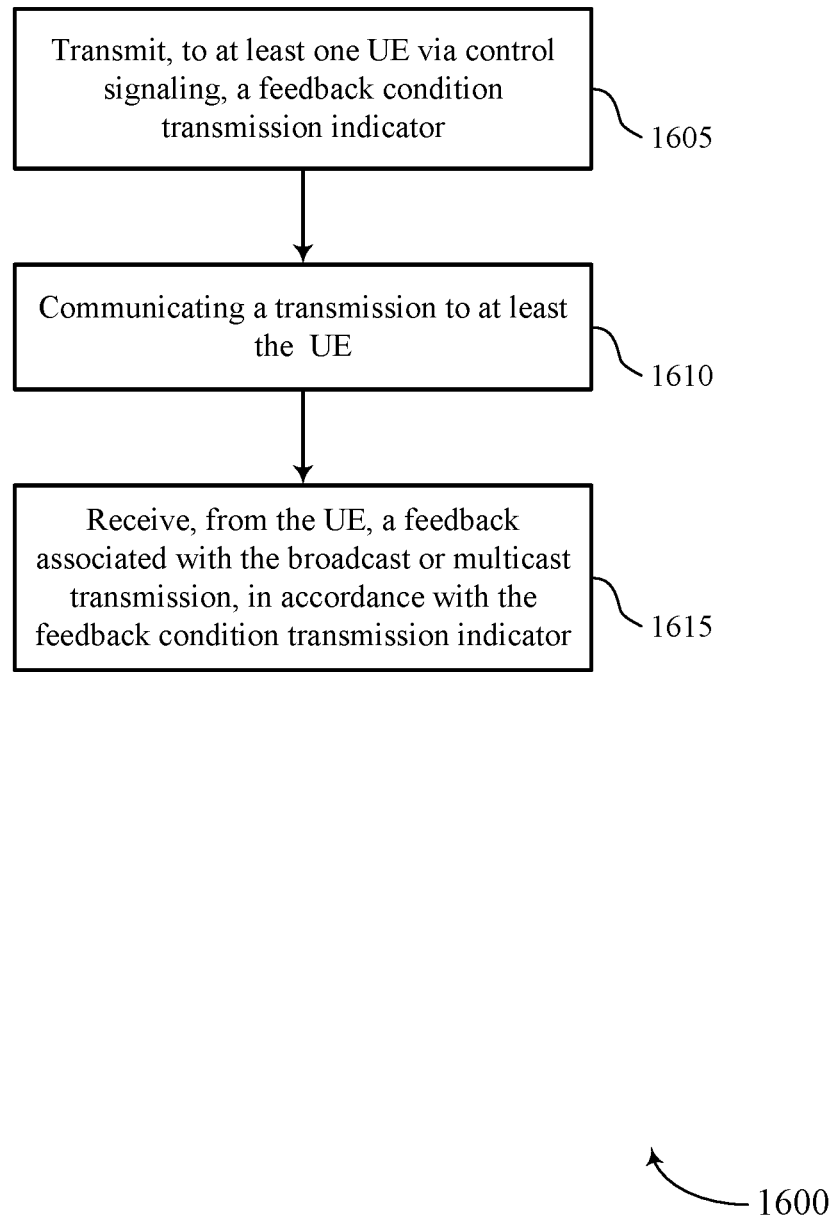

FIG. 16 shows a flowchart illustrating a method 1600 that supports priority-based feedback triggering in accordance with aspects of the present disclosure. The operations of method 1600 may be implemented by a transmitting device such as UE 115 or base station 105 or the respective components as described herein. For example, the operations of method 1600 may be performed by a UE communications manager as described with reference to FIGS. 6 through 9. In some examples, a UE may execute a set of instructions to control the functional elements of the UE or base station to perform the functions described herein. Additionally or alternatively, a UE may perform aspects of the functions described herein using special-purpose hardware.

At 1605, the UE may transmit, to at least one UE via control signaling, a negative acknowledgement (NAK) condition transmission indicator. The operations of 1605 may be performed according to the methods described herein. In some examples, aspects of the operations of 1605 may be performed by a feedback condition transmitter as described with reference to FIGS. 6 through 9.

At 1610, the UE may broadcast or multicast a transmission to at least the UE. The operations of 1610 may be performed according to the methods described herein. In some examples, aspects of the operations of 1610 may be performed by a broadcasting component as described with reference to FIGS. 6 through 9.

At 1615, the UE may receive, from the UE, a NAK associated with the broadcast or multicast transmission, in accordance with the NAK condition transmission indicator. The operations of 1615 may be performed according to the methods described herein. In some examples, aspects of the operations of 1615 may be performed by a feedback receiver as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying a first priority level of a first transmission by a transmitting device, wherein the first transmission is subject to a feedback condition;
    identifying a second priority level associated with a second transmission scheduled to be received at a time that the UE is scheduled to transmit feedback for the first transmission in accordance with the feedback condition;
    comparing the first priority level with the second priority level;
    determining whether to transmit the feedback for the first transmission based at least in part on the comparing and on the UE operating in half duplex; and
    communicating with the transmitting device in accordance with the determining.

2. The method of claim 1, wherein identifying the second priority level comprises:
    identifying the second priority level based at least in part on a priority level associated with a transmission by the UE, wherein the second transmission is feedback corresponding to the transmission by the UE.

3. The method of claim 1, wherein determining whether to transmit the feedback for the first transmission comprises:
    determining that the first priority level is greater than the second priority level based at least in part on the comparing; and
    determining to transmit the feedback for the first transmission to the transmitting device based at least in part on the first priority level being greater than the second priority level.

4. The method of claim 1, wherein determining whether to transmit the feedback for the first transmission comprises:
    determining that the first priority level is less than the second priority level based at least in part on the comparing; and
    determining to avoid transmission of the feedback for the first transmission based at least in part on the first priority level being less than the second priority level.

5. The method of claim 1, wherein determining whether to transmit the feedback for the first transmission comprises:
    determining that the first priority level is less than the second priority level based at least in part on the comparing;
    estimating a decoding performance associated with receipt of the second transmission that would result from transmission of the feedback for the first transmission during the time that the second transmission is scheduled to be received; and
    determining to transmit the feedback for the first transmission during the time based at least in part on the decoding performance.

6. The method of claim 5, wherein the estimating is dependent on a capability of the UE.

7. The method of claim 1, wherein determining whether to transmit the feedback for the first transmission comprises:
    determining that the first priority level corresponds to the second priority level based at least in part on the comparing.

8. The method of claim 7, further comprising:
    determining to transmit the feedback to the transmitting device based at least in part on a feedback transmission probability.

9. The method of claim 8, wherein the feedback transmission probability is based at least in part on a distance between the UE and the transmitting device, a determined congestion level, or a combination thereof.

10. The method of claim 8, further comprising:
    receiving, from the transmitting device, sidelink control signaling indicating the feedback transmission probability.

11. The method of claim 7, further comprising:
    identifying that the first transmission is subject to a negative acknowledgement (NAK) in accordance with the feedback condition; and
    identifying a signal condition from which the NAK arises, wherein the signal condition indicates at least whether the NAK is caused by signal interference.

12. The method of claim 11, further comprising:
    identifying that the NAK is caused by the signal interference; and
    determining, responsive to the signal interference causing the NAK, to transmit the NAK to the transmitting device based at least in part on a NAK transmission probability.

13. The method of claim 12, wherein the NAK transmission probability is based at least in part on a distance between the UE and the transmitting device, a determined congestion level, or a combination thereof.

14. The method of claim 11, further comprising:
    identifying a source other than signal interference from which the NAK arises; and
    determining to transmit the NAK based at least in part on the identifying the source other than signal interference.

15. The method of claim 14, wherein determining to transmit the NAK comprises:
    comparing a congestion level to a threshold, wherein the determining to transmit the NAK is based at least in part on the comparing.

16. The method of claim 15, further comprising:
    receiving the threshold from the transmitting device.

17. The method of claim 15, further comprising:
    determining the threshold at the UE.

18. The method of claim 15, further comprising:
    comparing a distance between the UE and the transmitting device to the threshold, wherein the determining to transmit the NAK is based at least in part on the comparing and wherein the threshold is a distance threshold.

19. The method of claim 11, wherein identifying the signal condition comprises:
    determining a measurement for one or both of reference signal received power (RSRP) and reference signal received quality (RSRQ); and
    identifying whether the measurement is higher than a threshold to identify the signal condition.

20. The method of claim 11, wherein identifying the signal condition comprises:
    receiving a first control signal from a first transmitting device and a second control signal from a second transmitting device, wherein the first transmitting device and the second transmitting device are determined to satisfy a proximity condition based at least in part on the first control signal and the second control signal;
    decoding the first control signal and the second control signal to identify that the first control signal and the second control signal are subject to interference; and
    identifying that the NAK is caused by the signal interference based at least in part on the decoding.

21. An apparatus for wireless communication at a user equipment (UE), comprising:
    a processor, memory coupled with the processor; and
    instructions stored in the memory and executable by the processor to cause the apparatus to:
        identify a first priority level of a first transmission by a transmitting device, wherein the first transmission is subject to a feedback condition;
        identify a second priority level associated with a second transmission scheduled to be received at a time that the UE is scheduled to transmit feedback for the first transmission in accordance with the feedback condition;
        compare the first priority level with the second priority level;
        determine whether to transmit the feedback for the first transmission based at least in part on the comparing and on the UE operating in half duplex; and
        communicate with the transmitting device in accordance with the determining.

22. The apparatus of claim 21, wherein the instructions to identify the second priority level are executable by the processor to cause the apparatus to:
    identify the second priority level based at least in part on a priority level associated with a transmission by the UE, wherein the second transmission is feedback corresponding to the transmission by the UE.

23. The apparatus of claim 21, wherein the instructions to determine whether to transmit the feedback for the first transmission are executable by the processor to cause the apparatus to:
    determine that the first priority level is greater than the second priority level based at least in part on the comparing; and
    determine to transmit the feedback for the first transmission to the transmitting device based at least in part on the first priority level being greater than the second priority level.

24. An apparatus for wireless communication at a user equipment (UE), comprising:
    means for identifying a first priority level of a first transmission by a transmitting device, wherein the first transmission is subject to a feedback condition;
    means for identifying a second priority level associated with a second transmission scheduled to be received at a time that the UE is scheduled to transmit feedback for the first transmission in accordance with the feedback condition;
    means for comparing the first priority level with the second priority level;
    means for determining whether to transmit the feedback for the first transmission based at least in part on the comparing and on the UE operating in half duplex; and
    means for communicating with the transmitting device in accordance with the determining.

25. The apparatus of claim 24, wherein the means for identifying the second priority level comprise:
    means for identifying the second priority level based at least in part on a priority level associated with a transmission by the UE, wherein the second transmission is feedback corresponding to the transmission by the UE.

26. The apparatus of claim 24, wherein the means for determining whether to transmit the feedback for the first transmission comprise:
    means for determining that the first priority level is greater than the second priority level based at least in part on the comparing; and
    means for determining to transmit the feedback for the first transmission to the transmitting device based at least in part on the first priority level being greater than the second priority level.

27. The apparatus of claim 24, wherein the means for determining whether to transmit the feedback for the first transmission comprise:
    means for determining that the first priority level is less than the second priority level based at least in part on the comparing; and
    means for determining to avoid transmission of the feedback for the first transmission based at least in part on the first priority level being less than the second priority level.

28. A non-transitory computer-readable medium storing code for wireless communication at a user equipment (UE), the code comprising instructions executable by a processor to:
    identify a first priority level of a first transmission by a transmitting device, wherein the first transmission is subject to a feedback condition;
    identify a second priority level associated with a second transmission scheduled to be received at a time that the UE is scheduled to transmit feedback for the first transmission in accordance with the feedback condition;
    compare the first priority level with the second priority level;
    determine whether to transmit the feedback for the first transmission based at least in part on the comparing and on the UE operating in half duplex; and
    communicate with the transmitting device in accordance with the determining.

29. The non-transitory computer-readable medium of claim 28, wherein the instructions to identify the second priority level are executable by the processor to:
    identify the second priority level based at least in part on a priority level associated with a transmission by the UE, wherein the second transmission is feedback corresponding to the transmission by the UE.

30. The non-transitory computer-readable medium of claim 28, wherein the instructions to determine whether to transmit the feedback for the first transmission are executable by the processor to:
- determine that the first priority level is greater than the second priority level based at least in part on the comparing; and
- determine to transmit the feedback for the first transmission to the transmitting device based at least in part on the first priority level being greater than the second priority level.

* * * * *